(12) United States Patent
Hinds et al.

(10) Patent No.: US 10,579,338 B2
(45) Date of Patent: Mar. 3, 2020

(54) APPARATUS AND METHOD FOR PROCESSING INPUT OPERAND VALUES

(71) Applicant: ARM Limited, Cambridge (GB)

(72) Inventors: Christopher Neal Hinds, Austin, TX (US); Neil Burgess, Wales (GB); David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 49 days.

(21) Appl. No.: 15/833,372

(22) Filed: Dec. 6, 2017

(65) Prior Publication Data

US 2018/0217815 A1   Aug. 2, 2018

Related U.S. Application Data

(60) Provisional application No. 62/452,035, filed on Jan. 30, 2017.

(51) Int. Cl.
*G06F 7/57* (2006.01)
*G06F 17/16* (2006.01)

(52) U.S. Cl.
CPC .............. *G06F 7/57* (2013.01); *G06F 17/16* (2013.01)

(58) Field of Classification Search
None
See application file for complete search history.

(56) References Cited

U.S. PATENT DOCUMENTS

| 8,200,948 B2* | 6/2012 | Kershaw ............. G06F 9/30032 712/221 |
| 8,266,198 B2* | 9/2012 | Lee ..................... G06F 7/49921 326/37 |
| 9,665,347 B2 | 5/2017 | Lutz et al. |
| 9,690,543 B2 | 6/2017 | Lutz et al. |
| 9,703,529 B2 | 7/2017 | Lutz et al. |

(Continued)

OTHER PUBLICATIONS

Bedichek, "Some Efficient Architecture Simulation Techniques", USENIX Conference, Winter 1990, pp. 53-63.

(Continued)

*Primary Examiner* — Michael D. Yaary
(74) *Attorney, Agent, or Firm* — Nixon & Vanderhye P.C.

(57) ABSTRACT

An apparatus and method are provided for processing input operand values. The apparatus has a set of vector data storage elements, each vector data storage element providing a plurality of sections for storing data values. A plurality of lanes are considered to be provided within the set of storage elements, where each lane comprises a corresponding section from each vector data storage element. Processing circuitry is arranged to perform an arithmetic operation on an input operand value comprising a plurality of portions, by performing an independent arithmetic operation on each of the plurality of portions, in order to produce a result value comprising a plurality of result portions. Storage circuitry is arranged to store the result value within a selected lane of the plurality of lanes, such that each result portion is stored in a different vector data storage element within the corresponding section for the selected lane. Such an approach allows efficient processing of input operand values in a manner that is not constrained by the size of the vector data storage elements, and in particular in a way that is vector length agnostic.

22 Claims, 21 Drawing Sheets

(56) References Cited

U.S. PATENT DOCUMENTS

| | | | |
|---|---|---|---|
| 9,766,857 B2 | 9/2017 | Lutz et al. | |
| 9,766,858 B2 | 9/2017 | Lutz et al. | |
| 9,778,906 B2 | 10/2017 | Lutz et al. | |
| 2003/0158881 A1 | 8/2003 | Liao et al. | |
| 2005/0125476 A1* | 6/2005 | Symes | G06F 9/30014 708/524 |
| 2005/0198473 A1* | 9/2005 | Ford | G06F 7/76 712/221 |
| 2005/0273485 A1* | 12/2005 | Kershaw | G06F 7/5318 708/700 |
| 2009/0006512 A1* | 1/2009 | Ozturk | G06F 7/724 708/205 |
| 2016/0124710 A1 | 5/2016 | Lutz et al. | |
| 2016/0124712 A1 | 5/2016 | Larri et al. | |

OTHER PUBLICATIONS

Catanzaro, Presentation Slides for "Computer Arithmetic in Deep Learning," identified in Keynote Talks for the Proc. 23rd IEEE Symposium on Computer Arithmetic, Santa Clara, CA, Jul. 2016, 46 pages.

Catanzaro, Abstract and Biography for "Computer Arithmetic in Deep Learning," identified in Keynote Talks for the *Proc. 23$^{rd}$ IEEE Symposium on Computer Arithmetic*, Santa Clara, CA, Jul. 2016, p. 2 of 7 pages.

Demmel et al., "Parallel Reproducible Summation", IEEE Transactions on Computers, vol. 64, No. 7, Jul. 2015, pp. 2060-2070.

Hida et al., "Algorithms for Quad-Double Precision Floating Point Arithmetic" Proc. 15th IEEE Symposium on Computer Arithmetic, Vail CO, Jun. 2001, pp. 155-162.

Stephens et al., "The ARM Scalable Vector Extension", IEE Micro, Mar./Apr. 2017, pp. 26-39.

Kulisch et al. "Computer Arithmetic in Theory and Practice" Academic Press, New York, 1981.

International Search Report and Written Opinion of the International Searching Authority dated Mar. 23, 2018 in PCT/GB2017/053903, 15 pages.

S. Collange et al, "Full-Speed Deterministic Bit-Accurate Parallel Floating-Point Summation on Multi- and Many-Core Architectures" Jan. 10, 2015, 12 pages.

R.M. Neal, "Fast Exact Summation Using Small and Large Superaccumulators" May 20, 2015, pp. 1-22.

* cited by examiner

RHPA
(1) 4 x 64-bit portions
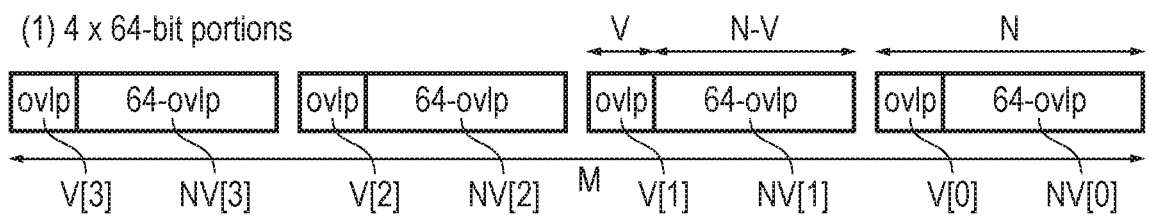
(2) (256-3*ovlp)-bit view, showing the weight of each bit
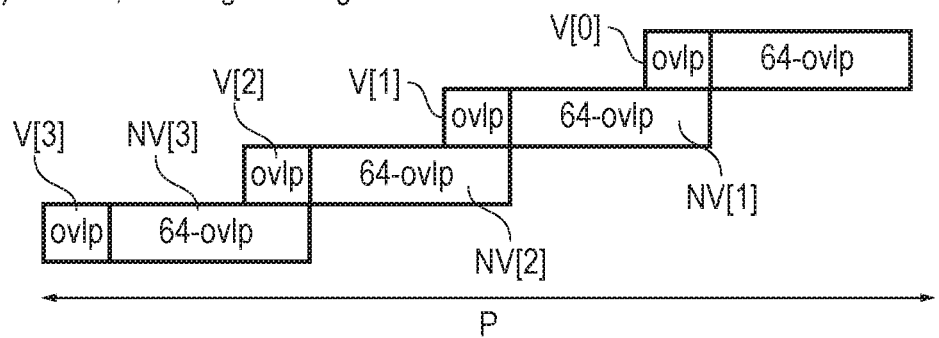
(3) (256-3*ovlp)-bit view, with overlap bits sign extended
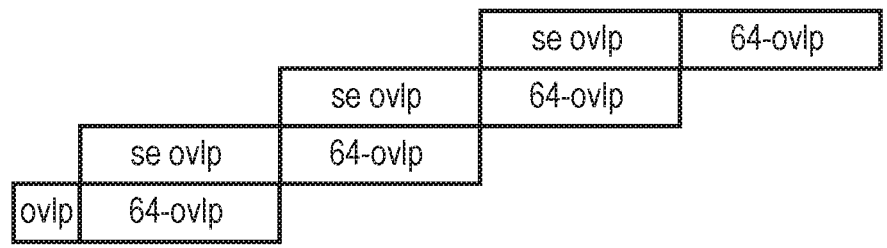
FIG. 4

|        | Lane 3  | Lane 2  | Lane 1  | Lane 0  |
|--------|---------|---------|---------|---------|
| Zn     | FP[3]   | FP[2]   | FP[1]   | FP[0]   |
| Zn+1   | FP[7]   | FP[6]   | FP[5]   | FP[4]   |
| Zn+2   | FP[11]  | FP[10]  | FP[9]   | FP[8]   |

|          | Lane 3 | Lane 2 | Lane 1 | Lane 0 |
|----------|--------|--------|--------|--------|
| Zm,index | Vm[i]  | Vm[i]  | Vm[i]  | Vm[i]  |

FIG. 10A

• FCVTH (Zd, Zm[0], Zn)

|          | Lane 3 | Lane 2 | Lane 1 | Lane 0 |
|----------|--------|--------|--------|--------|
| Index = 0 | Vm[0]  | Vm[0]  | Vm[0]  | Vm[0]  |

| Zn | FP[3] | FP[2] | FP[1] | FP[0] |

| Zd | A[0][3] | A[0][2] | A[0][1] | A[0][0] |

FIG. 10B

|         | Lane 3 | Lane 2 | Lane 1 | Lane 0 |
|---------|--------|--------|--------|--------|
| Index = 0 | Vm[0] | Vm[0] | Vm[0] | Vm[0] |

- FCVTH (Zd, Zm[0], Zn)
- FCVTAH (Zda, Zm[0], Zn+1)

| Zn   | FP[3] | FP[2] | FP[1] | FP[0] |
|------|-------|-------|-------|-------|
| Zn+1 | FP[7] | FP[6] | FP[5] | FP[4] |

| Zda | A[0][3] | A[0][2] | A[0][1] | A[0][0] |
|-----|---------|---------|---------|---------|

FIG. 10C

|  | Lane 3 | Lane 2 | Lane 1 | Lane 0 |
|---|---|---|---|---|
| Index = 0 | Vm[0] | Vm[0] | Vm[0] | Vm[0] |

- FCVTH (Zd, Zm[0], Zn)
- FCVTAH (Zda, Zm[0], Zn+1)
- ...

| Zn | FP[3] | FP[2] | FP[1] | FP[0] |
|---|---|---|---|---|
| Zn+1 | FP[7] | FP[6] | FP[5] | FP[4] |
| Zn+2 | FP[11] | FP[10] | FP[9] | FP[8] |

| Zda | A[0][3] | A[0][2] | A[0][1] | A[0][0] |
|---|---|---|---|---|

FIG. 10D

|         | Lane 3 | Lane 2 | Lane 1 | Lane 0 |
|---------|--------|--------|--------|--------|
| Index = 1 | Vm[1] | Vm[1] | Vm[1] | Vm[1] |

- FCVTH (Zd+1, Zm[1], Zn)

| Zn | FP[3] | FP[2] | FP[1] | FP[0] |
|----|-------|-------|-------|-------|

| Zd   | A[0][3] | A[0][2] | A[0][1] | A[0][0] |
|------|---------|---------|---------|---------|
| Zd+1 | A[1][3] | A[1][2] | A[1][1] | A[1][0] |

FIG. 10E

|         | Lane 3 | Lane 2 | Lane 1 | Lane 0 |
|---------|--------|--------|--------|--------|
| Index = 1 | Vm[1]  | Vm[1]  | Vm[1]  | Vm[1]  |

- FCVTH (Zd+1, Zm[1], Zn)
- FCVTAH (Zda+1, Zm[1], Zn+1)
- ...

|      |        |        |        |        |
|------|--------|--------|--------|--------|
| Zn   | FP[3]  | FP[2]  | FP[1]  | FP[0]  |
| Zn+1 | FP[7]  | FP[6]  | FP[5]  | FP[4]  |
| Zn+2 | FP[11] | FP[10] | FP[9]  | FP[8]  |

|       |        |        |        |        |
|-------|--------|--------|--------|--------|
| Zda   | A[0][3] | A[0][2] | A[0][1] | A[0][0] |
| Zda+1 | A[1][3] | A[1][2] | A[1][1] | A[1][0] |

FIG. 10F

|  | Lane 3 | Lane 2 | Lane 1 | Lane 0 |
|---|---|---|---|---|
| Index = 1 | Vm[1] | Vm[1] | Vm[1] | Vm[1] |

| Zn | FP[3] | FP[2] | FP[1] | FP[0] |
|---|---|---|---|---|
| Zn+1 | FP[7] | FP[6] | FP[5] | FP[4] |
| Zn+2 | FP[11] | FP[10] | FP[9] | FP[8] |

- 4 HPA accumulators A[1:0]
- Vector-length agnostic

| Zda | A[0][3] | A[0][2] | A[0][1] | A[0][0] |
|---|---|---|---|---|
| Zda+1 | A[1][3] | A[1][2] | A[1][1] | A[1][0] |

FIG. 10G resolve overlaps

| Zda   | A[0][3] | A[0][2] | A[0][1] | A[0][0] |
|-------|---------|---------|---------|---------|
| Zda+1 | A[1][3] | A[1][2] | A[1][1] | A[1][0] |
| Zda+2 | A[2][3] | A[2][2] | A[2][1] | A[2][0] |

- Infrequent operation
  - Add upper bits of Zda to bottom of Zda+1 & then reset to zero
- Can use existing SVE instructions!
  - ASR Z4, Zda, #(64 − ovlp)
  - ADD Zda+1, Zda+1, Z4
  - AND Zda, Zda, #(ovlp 0's: 64-ovlp 1's)
  - ASR Z4, Zda+1, #(64 − ovlp)
  - ADD Zda+2, Zda+2, Z4
  - AND Zda+1, Zda+1, #(ovlp 0's: 64-ovlp 1's)
  - ...

- All overlap bits set to 0, except in most significant HPA register
  - Could be −ve
  - Check for overflow

FIG. 11

HPA "reduction"

- Infrequent operation
  - Assume overlaps have been resolved
    - Removes need to specify value of ovlp
  - HPA values in the same register have same anchor
  - → can use existing SVE reduction
  - SADDV (Dd, Zda)
  - SADDV (Dd+1, Zda+1)
  - SADDV (Dd+2, Zda+2)
  - ...
- Will need to resolve carries across "scalar" HPA

| Zda   | A[0][3] | A[0][2] | A[0][1] | A[0][0] |
|-------|---------|---------|---------|---------|
| Zda+1 | A[1][3] | A[1][2] | A[1][1] | A[1][0] |
| Zda+2 | A[2][3] | A[2][2] | A[2][1] | A[2][0] |

| | | | | |
|---|---|---|---|---|
| Dd   | - | - | - | HPA[0] | ← 370
| Dd+1 | - | - | - | HPA[1] | ← 372
| Dd+2 | - | - | - | HPA[2] | ← 374

↑ ONE HPA NUMBER

FIG. 12 convert HPA to FP

- Infrequent operation
- FP64 result is exact if ovlp ≥ 11
- Logic similar to SCVTF (64-b → DP)
  - HCVTF (Dd, Zm[0], Dn)
  - HCVTF (Dd+1, Zm[1], Dn+1)
  - HCVTF (Dd+2, Zm[2], Dn+2)
  - ...
- Can use sequence of SVE predicated CPY's to construct vector of FP values numerically equivalent to HPA

| Dd   | - | - | - | FP[0] |
|------|---|---|---|-------|
| Dd+1 | - | - | - | FP[1] |
| Dd+2 | - | - | - | FP[2] |

| Zd | - | FP[2] | FP[1] | FP[0] |
|----|---|-------|-------|-------|

FIG. 13

APPARATUS AND METHOD FOR PROCESSING INPUT OPERAND VALUES

This application claims benefit to U.S. Provisional Application No. 62/452,035, filed Jan. 30, 2017, and is incorporated herein by reference.

BACKGROUND

The present technique relates to the field of data processing.

It is common to use floating-point (FP) representation in data processing systems. A floating-point number includes a significand and an exponent indicating a significance of the bits of the significand. This allows numeric values over a large range to be represented using a finite number of bits. However, a problem with floating-point arithmetic is that calculations are generally non-associative, a fact that makes sums problematic. In particular programmers need to worry about obtaining different results, even when adding a small number of values.

To seek to address the associativity issue, a new datatype has been proposed, called a high-precision anchored (HPA) number. A high-precision anchored (HPA) number is a pair (i, a) consisting of a long two's complement integer i (e.g. 200 bits), and a smaller anchor integer a that represents the weights of the bits of i, typically by specifying the significance of the smallest bit of i. Floating-point values can be converted into HPA form, and thereafter additions can be performed in an associative manner.

HPA values can be processed on vector processing circuitry where each long integer of an HPA number may be stored in a separate vector register. However, how efficiently the HPA numbers can be processed will depend on the vector lengths handled by the particular vector processing circuitry.

SUMMARY

In accordance with a first example configuration, an apparatus is provided comprising: a set of vector data storage elements, each vector data storage element providing a plurality of sections for storing data values, a plurality of lanes being provided within the set where each lane comprises a corresponding section from each vector data storage element; processing circuitry to perform an arithmetic operation on an input operand value comprising a plurality of portions, by performing an independent arithmetic operation on each of the plurality of portions, in order to produce a result value comprising a plurality of result portions; and storage circuitry to store the result value within a selected lane of said plurality of lanes, such that each result portion is stored in a different vector data storage element within the corresponding section for the selected lane.

In accordance with a second example arrangement, there is provided a method of processing an input operand value having a plurality of portions, comprising: providing a set of vector data storage elements, each vector data storage element providing a plurality of sections for storing data values, a plurality of lanes being provided within the set where each lane comprises a corresponding section from each vector data storage element; performing an arithmetic operation on the input operand value by performing an independent arithmetic operation on each of the plurality of portions, in order to produce a result value comprising a plurality of result portions; and storing the result value within a selected lane of said plurality of lanes, such that each result portion is stored in a different vector data storage element within the corresponding section for the selected lane.

In accordance with another example configuration, an apparatus is provided comprising a set of vector data storage means, each vector data storage means for providing a plurality of sections for storing data values, a plurality of lanes being provided within the set where each lane comprises a corresponding section from each vector data storage means; processing means for performing an arithmetic operation on an input operand value comprising a plurality of portions, by performing an independent arithmetic operation on each of the plurality of portions, in order to produce a result value comprising a plurality of result portions; and storage means for storing the result value within a selected lane of said plurality of lanes, such that each result portion is stored in a different vector data storage means within the corresponding section for the selected lane.

In a yet further example configuration, there is provided a computer program for controlling a host data processing apparatus to provide an instruction execution environment comprising: a set of vector data structures, each vector data structure providing a plurality of sections for storing data values, a plurality of lanes being provided within the set where each lane comprises a corresponding section from each vector data structure; processing program logic to perform an arithmetic operation on an input operand value comprising a plurality of portions, by performing an independent arithmetic operation on each of the plurality of portions, in order to produce a result value comprising a plurality of result portions; and storage program logic to store the result value within a selected lane of said plurality of lanes, such that each result portion is stored in a different vector data structure within the corresponding section for the selected lane.

BRIEF DESCRIPTION OF THE DRAWINGS

The present technique will be described further, by way of illustration only, with reference to examples thereof as illustrated in the accompanying drawings, in which:

FIG. 4 shows an example of a Redundant HPA value, which represents a numeric value using a redundant representation including a number of N-bit portions with overlapping significance;

FIGS. 10A to 10G provide a specific example of the operations illustrated in FIG. 9;

FIG. 11 illustrates a process that can be performed to resolve overlaps when using the redundant HPA form;

FIG. 12 illustrates a process that can be used to reduce the HPA results produced in multiple lanes into a single HPA result;

FIG. 13 illustrates how an HPA result may be converted back into a series of floating-point numbers in accordance with one example.

DESCRIPTION OF EXAMPLES

Figure 1:
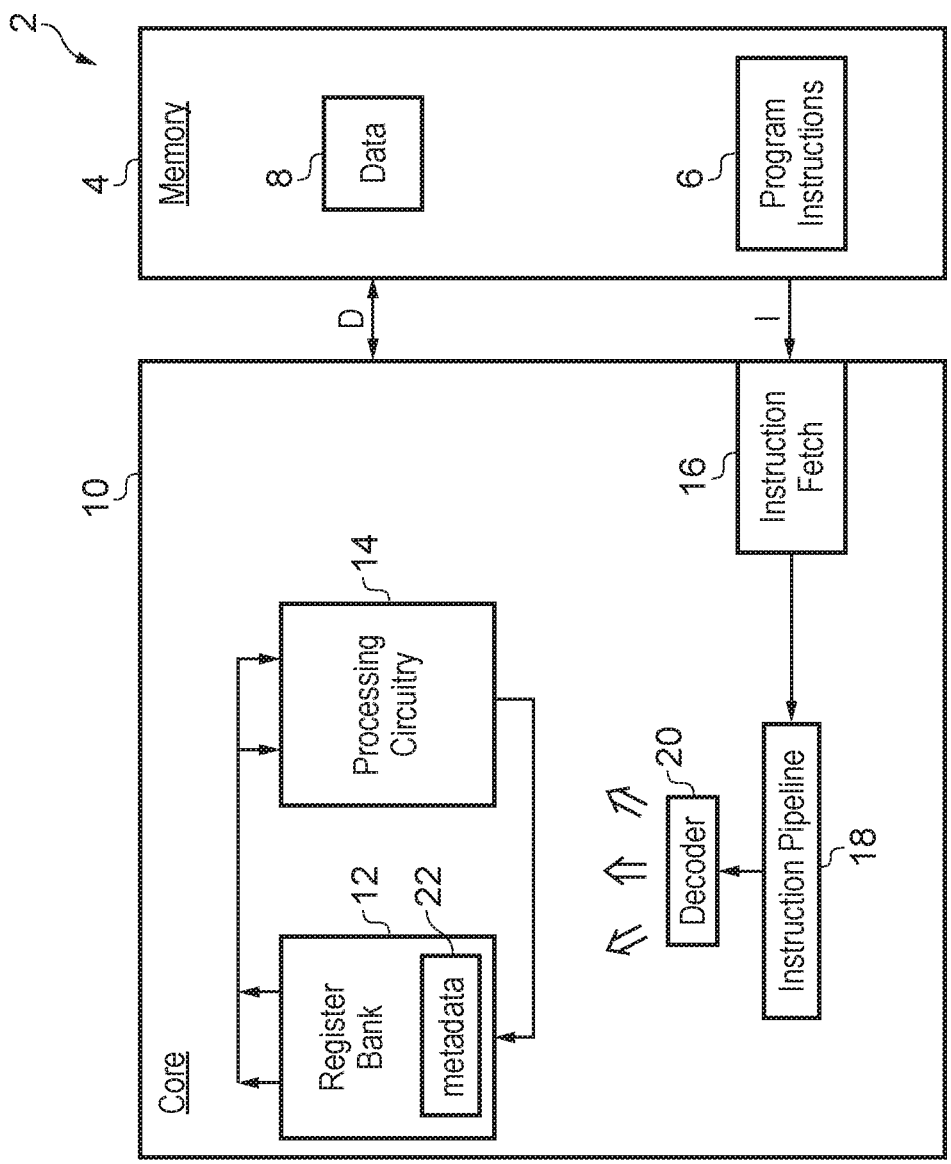
FIG. 1 schematically illustrates a data processing apparatus.

As mentioned earlier, a problem with floating-point arithmetic is that calculations are generally non-associative, a fact that makes sums problematic. For example, when adding several floating-point values, each time another value is added to the result of the previous addition, the result is rounded and normalised, which means that the overall result is different depending on the order in which the values are added. This makes it difficult to parallelize floating-point arithmetic, because sums are not reproducible unless completed in the exact same order. To generate a reproducible result, a series of additions or subtractions typically have to be performed sequentially, which can make floating-point arithmetic relatively slow.

Programmers therefore use higher accuracy than they need, in the hope of avoiding such different results. Programmers, therefore, cannot easily parallelize code because sums are not reproducible unless computed in the exact same order.

The problem is especially acute for high-performance computing (HPC), where programs may need to add millions of values. Programmers would like to parallelize these problems, but then the lack of reproducibility makes debugging difficult. Every different machine configuration will produce different answers even if the reprogramming for those machines is done perfectly.

As mentioned above, to seek to address the associativity issue, a new datatype has been proposed, called a high-precision anchored (HPA) number. An HPA number is a pair (i, a) consisting of a long two's complement integer i (e.g. 200 bits), and a smaller anchor integer a that represents the weights of the bits of i, typically by specifying the significance of the smallest bit of i. The pair is somewhat analogous to an FP number's significand and exponent values, but differs in that the long integer i is not normalized and is usually much larger than an FP significand, and in that the anchor value a is fixed for all operands in an HPA operation. Adding FP numbers may cause the exponent to change, but adding HPA numbers does not change the anchor.

As a trivial example, consider an HPA representation consisting of a 10-bit i and an anchor value a=−4. Some values in this format are given in Table 1.

TABLE 1

| example HPA numbers (i, −4) | |
|---|---|
| i (binary) | value (decimal) |
| 00000_00001 | 0.0625 |
| 00000_01000 | 0.5 |
| 00000_11000 | 1.5 |

TABLE 1-continued

| example HPA numbers (i, −4) | |
|---|---|
| i (binary) | value (decimal) |
| 00001_00000 | 2.0 |
| 00100_11000 | 9.5 |
| 11111_01000 | −1.5 |

When adding two of these numbers, say 0.5 and 1.5, the anchor (−4) does not change, and the sum is conveniently given by adding just the i values. Since HPA sums are just two's complement addition, when the range is sufficient, HPA sums are associative, exact and repeatable.

FP numbers have a large range. Double precision numbers (FP64) can be smaller than $2^{-1000}$ and larger than $2^{1000}$, but most accumulations do not span this entire range. Indeed, it is hard to imagine the kind of problem that would meaningfully accumulate values over all of that range, and even for HPC most accumulations happen over a limited range. It is expected that 200 bits or so is more than enough for almost all applications requiring wider than double-precision arithmetic. Suppose that a programmer determines that all of the data for a particular sum has magnitude less than $2^{100}$, and that bits with magnitude below $2^{-50}$ won't affect the sum in any meaningful way. If the data is added using the HPA format (i, −50) with 200-bit i, then the accumulation is associative and at least $2^{49}$ of these numbers can be added in any order without worrying about overflow.

Most modern architectures have SIMD (Single Instruction Multiple Data) units which could be used to represent long integers. With a bit of extra logic to facilitate carries between 64-bit lanes, a 256-bit SIMD unit could be used to add 256-bit integers. Alternatively, carries between lanes could be avoided for most additions by using a redundant representation discussed in more detail later. Both of these methods hold a long integer within a single SIMD register.

However, the efficiency with which HPA integers can be processed within such SIMD units depends on the vector width of the SIMD units. Accordingly, it would be desirable to provide a mechanism that enabled efficient processing of long integer values such as those requiring processing when handling HPA numbers, which was independent of the vector width being processed by particular SIMD units, hence allowing the technique to be adopted on a wide variety of different systems.

In accordance with one example arrangement, an apparatus is provided that has a set of vector data storage elements, where each vector data storage element provides a plurality of sections for storing data values. A plurality of lanes are considered to extend through the set of vector data storage elements, such that each lane comprises a corresponding section from each vector data storage element. The storage elements can take a variety of forms, but in one example arrangement are vector registers of a vector register file.

Processing circuitry is arranged to perform an arithmetic operation on an input operand value comprising a plurality of portions. The arithmetic operation is implemented by performing an independent arithmetic operation on each of the plurality of portions, and results in the production of a result value comprising a plurality of result portions.

However, rather than storing the result value within a single vector data storage element, instead storage circuitry is arranged to store the result value within a selected lane of the plurality of lanes. By such an approach, each result portion is then stored in a different vector storage element within the corresponding section for the selected lane.

In accordance with the above described technique, it can be seen that the result value is hence stored in a common lane across a plurality of vector data storage registers. This provides a great deal of flexibility. In particular, the size of the result value is not constrained by the width of an individual vector data storage element, and instead the maximum size is only constrained by the number of vector data storage elements within the set.

Further, such an approach avoids inefficient utilisation of the vector data storage elements. In particular, no space within the vector data storage elements need be wasted by virtue of a mismatch between the size of a vector data storage element and the size of the result value. Indeed, in one example arrangement, parallel processing of multiple input operand values can be performed in a SIMD manner, with the corresponding result values being stored in associated lanes. In one example arrangement this means that an individual vector data storage element can store corresponding portions of multiple result values within its respective sections, with each of the result values extending through multiple vector data storage elements within their respective lane.

As a result, it can be seen that by storing the result values in the manner described above, this significantly improves scalability, and provides a technique which is vector-length agnostic, in that the chosen size of the input operand values and result values is not constrained by the width of the vectors processed by the apparatus.

In one example the processing circuitry is arranged to process each portion of the operand value as an integer value when performing the independent arithmetic operation. This ensures that multiple input operand values can be processed in any order, in a fully associative manner.

Any form of integer value can be processed using the techniques described herein. However, in one particular example the input operand value is the long integer component of an HPA number. Information about the associated anchor value can be maintained separately, and the long integer operands of multiple HPA numbers having the same anchor can then be processed very efficiently in a fully associative manner using the above described techniques.

In one example, the processing circuitry is arranged to perform the independent arithmetic operation sequentially multiple times, so as to produce within the selected lane one of the result portions of the result value each time the processing circuitry performs the independent arithmetic operation. The ordering of the independent arithmetic operations can be varied as desired. For example, in one example the independent arithmetic operations may be ordered so that the portions are processed starting with those representing the higher order bits and progressing to those representing the lower order bits, but alternatively they can be processed in the opposite order so that the portions associated with the lower order bits are processed before the portions associated with the higher order bits. Indeed, there is also no need to process the portions in an order dictated by the significance of the bits represented by those portions.

The arithmetic operation performed can take a variety of forms. However, in one example arrangement the processing circuitry is arranged to perform, as the arithmetic operation, an accumulation operation to accumulate the input operand value with another operand value that comprises the plurality of portions, in order to produce the result value comprising the plurality of result portions.

Such accumulation operations are required frequently in high performance computing environments where large volumes of numbers need to be added together, and accordingly the above described mechanism can provide a very efficient technique for processing such numbers. The other operand value can take a variety of forms but in one embodiment is an existing result value, and the processing circuitry is arranged to perform the accumulation operation in order to generate an updated result value to form the result value to be stored in the selected lane.

In one example, the storage circuitry may be arranged to store the existing result value across multiple vector data storage elements within the selected lane, and to overwrite each portion of the existing result value with the corresponding result portion of the result value generated by the processing circuitry when performing the accumulation operation. As a result, the same independent accumulation operation can be performed iteratively many times, in order to add together corresponding portions of multiple input operands in order to produce an accumulated result portion. That process can then be repeated in turn for each of the portions, so as to produce a result value representing the accumulation of many input operand values. Further, as mentioned earlier, this process can be repeated in parallel across multiple lanes, with each lane processing different multiple input operand values, providing a very high performance technique for accumulating a large number of input operand values.

In one example arrangement, the processing circuitry is arranged to identify a significance of bits of each portion of the input operand value based on an anchor value. In such an arrangement, the input operand value represents the long integer part of an HPA number, with that long integer being broken down into multiple portions. With knowledge of the anchor value, the processing circuitry can then determine the significance of the bits represented by each portion. This significance can be represented in a variety of ways. For example, it can identify the significance of the least significant bit in each portion.

The way in which this significance information is maintained can vary dependent on implementation. In one example, the apparatus further comprises metadata storage to hold metadata for the selected lane, the metadata comprising a metadata portion for each portion of the input operand value, and providing information enabling the processing circuitry to identify the significance of bits of each portion of the input operand value.

Hence, purely by way of example, if the input operand value comprised four portions, then the metadata held for the selected lane would identify a metadata portion for each of the four portions. As each independent arithmetic operation is performed on one of those portions, the corresponding metadata portion can be accessed as required.

In one example, the processing circuitry comprises conversion circuitry to generate each portion of the input operand value from a provided value and the corresponding metadata portion. Hence, in such an example the relevant metadata portion is referred to when seeking to convert the provided value into the input operand value.

In one particular example, the provided value is a floating-point value, and in association with each independent arithmetic operation the conversion circuitry is used to generate a corresponding portion of the input operand value from the floating-point value and the corresponding metadata portion. In particular, since the metadata portion will identify the significance of the bits associated with the corresponding portion of the input operand value, the conversion circuitry can determine from the floating-point value which bits of the significand of the floating-point value, if any, need to be represented within the current portion of the input operand value, and arrange for those bits to be positioned in the appropriate bit positions within the portion of the input operand value having regards to the significance information provided by the metadata portion.

In one example, the processing circuitry is arranged to perform, as the independent arithmetic operation, an independent accumulation operation to accumulate a corresponding portion from the input operand value with the corresponding portion of another operand value that comprises the plurality of portions, in order to produce a corresponding result portion of the result value, and the conversion circuitry is used during the independent accumulation operation to generate the corresponding portion of the input operand value from the floating-point value and the metadata portion associated with the corresponding portion.

Hence, in such an arrangement, the corresponding portion of the input operand value is generated "on the fly" by the conversion circuitry during performance of the independent accumulation operation, so that it can then be added to a corresponding portion of another operand value in order to produce the corresponding result portion of the result value. This provides a very efficient technique for performing the accumulation.

In one example, corresponding portions of the input operand value and the another operand value have the same bit significance.

The multiple portions of the input operand value can in one embodiment be arranged to be discrete, non-overlapping portions. However, in one example the various portions are arranged to overlap by a number of bits. In particular, in such an example the input operand value may comprise an M-bit value having a redundant representation representing a P-bit numeric value using the plurality of portions, where each portion comprises N bits, and where M>P>N. The processing circuitry may be configured to identify a significance of bits of each N-bit portion of the redundant representation based on an anchor value, and within a group of at least two adjacent N-bit portions, a plurality of overlap bits of a lower N-bit portion of the group have a same significance as a plurality of least significant bits of at least one upper N-bit portion of the group. By such an approach, it is possible to perform multiple instances of the independent arithmetic operations for a particular portion without needing to consider the possibility of overflow into a next portion representing more significant bits of the result value. Instead, the operations can continue until a point is reached where it is assessed that any further operations might result in an overflow from the overlap bits. At that point, steps can then be taken to migrate the information represented in the overlap bits into the next most significant result portion, whereafter independent processing of the portions can continue. This provides significantly enhanced performance by reducing the frequency with which potential overflow needs to be considered.

In one embodiment, the processing circuitry comprises conversion circuitry to perform a conversion operation to convert a provided value to a converted M-bit data value having the redundant representation. In one particular example, as discussed earlier, the conversion circuitry may perform the conversion on the fly in association with a relevant N-bit portion, so that the relevant N-bit portion is created from the provided value (for example a floating-point value) and is then processed by the associated independent arithmetic operation in order to produce the result portion.

As mentioned earlier, metadata storage can be used to hold metadata for the selected lane. In the above example where the input operand value has a redundant representation, the metadata may comprise a metadata portion for each N-bit portion of the input operand value, and provide information enabling the processing circuitry to identify the significance of bits of each N-bit portion and a number of overlap bits in each N-bit portion. If desired, other information can also be included within the metadata, for example to identify whether the portion in question represents the least significant bits of the input operand value, the most significant bits of the input operand value, or is an intermediate portion.

As mentioned earlier, when using the redundant representation multiple iterations of the independent arithmetic operations can be performed on the portions before consideration needs to be given to the possibility of overflow. However, when it is determined that a potential overflow condition is approaching, the processing circuitry can in one example be configured to perform an overlap reduction operation on a first M-bit value having the redundant representation to generate a second M-bit value having the redundant representation in which the overlap bits in at least one N-bit portion of the second M-bit value represent a smaller magnitude than the overlap bits of at least one corresponding N-bit portion of the first M-bit value. By reducing a given set of overlap bits closer to zero so that there is more scope for accommodating further carries during subsequent additions, the chance of overflow between the portions is reduced.

The overlap reduction operation may in some examples be an overlap propagating operation to propagate overlap bits from one or more N-bit portions of a first M-bit value in the redundant representation to one or more subsequent portions of the first M-bit value to generate a second M-bit value having the redundant representation. The second M-bit value represents the same P-bit numeric value as the first M-bit value, but using a different pattern of overlap bits. Using an overlap propagation operation to achieve overlap reduction has an advantage that no addition register is required to preserve the values of overlap bits reduced in the overlap reduction. By propagating the values of overlap bits to the next portion, the non-overlap bits in the next portion can be adjusted to preserve the same value that was represented by the overlap bits in the preceding portion, freeing up space in the overlap bits of the preceding portion to accommodate more carries when further operations are performed on the redundantly represented second M-bit value.

The overlap propagating operation can be performed in a variety of ways. In one example, the overlap propagation operation is such that it converts the first M-bit value to a second M-bit value for which all overlap bits are equal to zero.

As mentioned earlier, the above described techniques can be replicated within multiple lanes to give rise to a very high performance mechanism for processing multiple input operand values. In particular, in one such example, the processing circuitry is replicated for each of a plurality of selected lanes, with an input operand value being provided for each of said plurality of selected lanes, where each of the plurality of input operand values comprises the plurality of portions, and each independent arithmetic operation is arranged to be performed in parallel across the plurality of selected lanes, in order to produce a plurality of result values each comprising a plurality of result portions. The storage circuitry is arranged to store each of the plurality of result values within a corresponding selected lane of the plurality of selected lanes, such that a corresponding result portion of each result value is stored in a corresponding section of the same vector data storage element.

The number of lanes used can vary as desired, but in one example all of the lanes may be utilised, so that the entire storage space within multiple vector data storage elements can be utilised during the process. Purely by way of example, if each operand value has three portions, then three vector data storage elements could be specified for holding the result portions of multiple result values, each register storing corresponding portions of those result values. If the width of the vector data storage elements were, for example, such that sixteen lanes can be provided, then this would enable operations to be performed in parallel on sixteen input operand values, with the associated result values being stored within their associated lanes, spread across the three vector data storage elements.

In such an arrangement, the metadata storage can be arranged to hold metadata for each selected lane, the metadata comprising a metadata portion for each portion of the corresponding input operand value, and providing information enabling the processing circuitry to identify the significance of bits of each portion of the corresponding input operand value. Within any particular lane, the operand values processed will typically be arranged to have the same significance. If desired, different lanes can operate on operand values having different significance to the operand values processed by other lanes. However, in one example, corresponding portions of the plurality of input operand values associated with the plurality of selected lanes have the same bit significance, and the metadata is replicated for each selected lane. By such an approach, a large number of input operand values having the same significance can be processed in parallel using the multiple lanes, and with the same metadata being used across all of the lanes.

As a result of such an approach, it will be appreciated that the performance of the arithmetic operations in parallel across the lanes will result in the generation of multiple result values having associated result portions. Corresponding result portions in each of those result values will then have the same significance.

As and when desired, in one embodiment the processing circuitry may further be arranged to then perform a reduction operation to combine the multiple result values into a single result value. Since corresponding portions of the multiple result values have the same significance, such an operation can be readily performed in order to produce a single result value from those multiple result values. If desired, that single result value can then be converted into another form, for example may be converted back into one or more floating-point values. By performing such a conversion back into a floating-point format, there is no need to separately maintain the anchor information, allowing the value to be stored back to memory.

Particular examples will now be described with reference to the Figures.

A high-precision anchor (HPA) format is discussed below. More information about the HPA format can be found in the U.S. patent application Ser. Nos. 62/074,149, 14/582,974, 14/582,875, 14/582,812, 14/582,836, 14/582,978, 14/606,510, and 14/582,968, the contents of which are entirely incorporated herein by reference.

Floating-Point Numbers

Floating-point (FP) is a useful way of approximating real numbers using a small number of bits. The IEEE 754-2008 FP standard proposes multiple different formats for FP numbers, some of which are binary 64 (also known as double precision, or DP), binary 32 (also known as single precision, or SP), and binary 16 (also known as half precision, or HP). The numbers 64, 32, and 16 refer to the number of bits required for each format.

Representation

FP numbers are quite similar to the "scientific notation" taught in science classes, where instead of negative two million we'd write $-2.0 \times 10^6$. The parts of this number are the sign (in this case negative), the significand (2.0), the base of the exponent (10), and the exponent (6). All of these parts have analogs in FP numbers, although there are differences, the most important of which is that the constituent parts are stored as binary numbers, and the base of the exponent is always 2.

More precisely, FP numbers consist of a sign bit, some number of biased exponent bits, and some number of fraction bits. In particular, the DP, SP and HP formats consist of the following bits:

TABLE 2

| format | sign | exponent | fraction | exponent bias |
|---|---|---|---|---|
| DP [63:0] | 63 | 62:52 (11 bits) | 51:0 (52 bits) | 1023 |
| SP [31:0] | 31 | 30:23 (8 bits) | 22:0 (23 bits) | 127 |
| HP [15:0] | 15 | 14:10 (5 bits) | 9:0 (10 bits) | 15 |

The sign is 1 for negative numbers and 0 for positive numbers. Every number, including zero, has a sign.

The exponent is biased, which means that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. HP and DP exponents work the same way, with the biases indicated in the table above.

SP exponent 255 (or DP exponent 2047, or HP exponent 31) is reserved for infinities and special symbols called NaNs (not a number). Infinities (which can be positive or negative) have a zero fraction. Any number with exponent 255 and a nonzero fraction is a NaN. Infinity provides a saturation value, so it actually means something like "this computation resulted in a number that is bigger than what we can represent in this format." NaNs are returned for operations that are not mathematically defined on the real numbers, for example division by zero or taking the square root of a negative number.

Exponent zero, in any of the formats, is reserved for subnormal numbers and zeros. A normal number represents the value:

$$-1^{sign} \times 1.\text{fraction} \times 2^e$$

where e is the true exponent computed from the biased exponent. The term 1.fraction is called the significand, and the 1 is not stored as part of the FP number, but is instead inferred from the exponent. All exponents except zero and the maximum exponent indicate a significand of the form 1.fraction. The exponent zero indicates a significand of the form 0.fraction, and a true exponent that is equal to 1-bias for the given format. Such a number is called subnormal (historically these numbers were referred to as denormal, but modern usage prefers the term subnormal).

Numbers with both exponent and fraction equal to zero are zeros.

The following table has some example numbers in HP format. The entries are in binary, with '_' characters added to increase readability. Notice that the subnormal entry (4th line of the table, with zero exponent) produces a different significand than the normal entry in the preceding line.

TABLE 3

| Sign | 5-bit exponent | 10-bit fraction | 11-bit significand | value |
|---|---|---|---|---|
| 0 | 01111 | 00_0000_0000 | 100_0000_0000 | $1.0 \times 2^0$ |
| 1 | 01110 | 10_0000_0000 | 110_0000_0000 | $-1.1 \times 2^{-1}$ |
| 0 | 00001 | 10_0000_0000 | 110_0000_0000 | $1.1 \times 2^{-14}$ |
| 0 | 00000 | 10_0000_0000 | 010_0000_0000 | $0.1 \times 2^{-14}$ |
| 1 | 11111 | 00_0000_0000 | | -infinity |
| 0 | 11111 | 00_1111_0011 | | NaN |

A large part of the complexity of FP implementation is due to subnormals, therefore they are often handled by microcode or software. Some processors handle subnormals in hardware, speeding up these operations by a factor of 10 to 100 compared to a software or microcode implementation.

Integers, Fixed-Point, Floating-Point

The FP way of handling signs is called sign-magnitude, and it is different from the usual way integers are stored in the computer (two's complement). In sign-magnitude representation, the positive and negative versions of the same number differ only in the sign bit. A 4-bit sign-magnitude integer, consisting of a sign bit and 3 significand bits, would represent plus and minus one as:

+1=0001

−1=1001

In two's complement representation, an n-bit integer i is represented by the low order n bits of the binary n+1-bit value $2^n+i$, so a 4-bit two's complement integer would represent plus and minus one as:

+1=0001

−1=1111

The two's complement format is practically universal for signed integers because it simplifies computer arithmetic.

A fixed-point number looks exactly like an integer, but actually represents a value that has a certain number of fractional bits. Sensor data is often in fixed-point format, and there is a great deal of fixed-point software that was written before the widespread adoption of FP. Fixed-point numbers are quite tedious to work with because a programmer has to keep track of the "binary point", i.e. the separator between the integer and fractional parts of the number, and also has to constantly shift the number to keep the bits in the correct place. FP numbers don't have this difficulty, so it is desirable to be able to convert between fixed-point numbers and FP numbers. Being able to do conversions also means that we can still use fixed-point software and data, but we are not limited to fixed-point when writing new software.

Rounding FP Numbers

Most FP operations are required by the IEEE-754 standard to be computed as if the operation were done with unbounded range and precision, and then rounded to fit into an FP number. If the computation exactly matches an FP number, then that value is always returned, but usually the computation results in a value that lies between two consecutive floating-point numbers. Rounding is the process of picking which of the two consecutive numbers should be returned.

There are a number of ways of rounding, called rounding modes; six of these are:

TABLE 4

| mode | | definition |
|---|---|---|
| RNE | round-to nearest, ties to even | pick the closest value, or if both values are equally close then pick the even value |
| RNA | round to nearest, ties to away | pick the closest value, or if both values are equally close then pick the value farthest away from zero |
| RZ | round to zero | pick the value closest to zero |
| RP | round to plus infinity | pick the value closest to plus infinity |
| RM | round to minus infinity | pick the value closest to minus infinity |
| RX | round to odd | pick the odd value |

The definition doesn't tell us how to round in any practical way. One common implementation is to do the operation, look at the truncated value (i.e. the value that fits into the FP format) as well as all of the remaining bits, and then adjust the truncated value if certain conditions hold. These computations are all based on:

L—(least) the least significant bit of the truncated value
G—(guard) the next most significant bit (i.e. the first bit not included in the truncation)
S—(sticky) the logical OR of all remaining bits that are not part of the truncation Given these three values and the truncated value, we can always compute the correctly rounded value according to the following table:

TABLE 5

| Mode | change to the truncated value |
|---|---|
| RNE | increment if (L&G) | (G&S) |
| RNA | increment if G |
| RZ | none |
| RP | increment if positive & (G | S) |
| RM | increment if negative & (G | S) |
| RX | set L if G | S |

For example, consider multiplying two 4-bit significands, and then rounding to a 4-bit significand.

sig1=1011(decimal 11)

sig2=0111(decimal 7)

multiplying yields sig1×sig2=1001 101(decimal 77) L Gss

The least significant bit of the truncated 4-bit result is labelled L, the next bit G, and S is the logical OR of the remaining bits labelled s (i.e. s=0|1=1). To round, we adjust our 4-bit result (1001) according to the rounding mode and the computation in the table above. So for instance in RNA rounding, G is set so we return 1001+1=1010. For RX rounding G|S is true so we set L to 1 (it's already 1, so in this case nothing changes) and return 1001.

Rounding Integer and Fixed-Point Numbers

If we convert an FP number to integer or fixed-point we also round. The concept is basically the same as FP rounding. An FP number that happens to be an integer always rounds to that integer. All other FP numbers lie between two consecutive integers, and rounding dictates which integer is returned. Unfortunately the rounding logic for integers is somewhat harder because of the differences between two's complement and sign-magnitude form. Incrementing a sign-magnitude number always increases the magnitude, so the incremented number is farther away from zero. The same thing happens for positive two's complement numbers, but negative two's complement numbers become closer to zero when incremented. This means that the rounding logic has to change based on whether the integer is positive or negative. It also means we have to be careful in picking the base value (the value which will be incremented or not). For positive integers, that value is just the truncated FP significand, so 1.37 will have a base value of 1, and a result of either 1 or 2. For negative integers, we again truncate the significand and take the one's complement of the result (one's complement is the original number with all bits inverted), −1.37 is truncated to 1 and then inverted, giving a base value of −2. Everything then works out since we want our result to be either −2 or (when incremented) −1.

To further complicate things, our method of conversion requires some computation to find L, G, and S for negative integers. Correct rounding would require us to complete the two's complement process (invert and add 1) and then compute L, G, and S, but adding that 1 is slow compared to just inverting. Ideally we would like to compute the actual L, G, and S from the original shifted input (i.e., from the input before we've done anything about signs. So the floating-point 1.37 or −1.37 would both be right shifted to the integer 1).

Let L0, G0, and S0 be the least significant bit (lsb), guard and sticky before inverting, and let Li, Gi, and Si be lsb, guard and sticky after inverting, and finally let L, G, and S be the lsb, guard and sticky after inverting and adding 1.

If S0 is zero, then the bits contributing to Si are all ones, and hence S (obtained by adding 1 to those Si bits) is also zero. If S0 is nonzero, then Si is not all ones, and hence S is nonzero. So in all cases S0=S.

If G0 is zero, then Gi is 1, and G is also one except for the case when there is a carry-in from the S bits, which only happens when S0 is zero. If G0 is 1, then Gi is zero, and again G is also one except for the case where there is a carry-in from the S bits, which only happens when S0 is zero. So G=G0^S0.

By very similar logic, L=L0^(G0|S0).

Now that we have L, G, and S for both negative and positive integers, we can come up with our rounding rules:

TABLE 6

| Mode | change to a positive value | change to a negative value |
|---|---|---|
| RNE | increment if (L&G) | (G&S) | increment if (L&G) | (G&S) |
| RNA | increment if G | increment if ( G&S) |
| RZ | none | increment if ( G | S) |
| RP | increment if ( G | S) | increment if ( G | S) |
| RM | none | none |
| RX | set L if G | S | set L if G | S |

Fixed-point numbers round exactly the same way as integers. The rules for unsigned conversions (to integer or fixed-point) are the same as the rules for positive conversions.

Injection Rounding

A faster way to do rounding is to inject a rounding constant as part of the significand addition that is part of almost every FP operation. To see how this works, consider adding numbers in dollars and cents and then rounding to dollars. If we add $1.27
+ $2.35
$3.62

We see that the sum $3.62 is closer to $4 than to $3, so either of the round-to-nearest modes should return $4. If we represented the numbers in binary, we could achieve the same result using the L, G, S method from the last section. But suppose we just add fifty cents and then truncate the result?

1.27
+ 2.35
+ 0.50 (rounding injection)
4.12

If we just returned the dollar amount ($4) from our sum ($4.12), then we have correctly rounded using RNA rounding mode. If we added $0.99 instead of $0.50, then we would correctly round using RP rounding. RNE is slightly more complicated: we add $0.50, truncate, and then look at the remaining cents. If the cents remaining are nonzero, then the truncated result is correct. If there are zero cents remaining, then we were exactly in between two dollar amounts before the injection, so we pick the even dollar amount. For binary FP this amounts to setting the least significant bit of the dollar amount to zero.

Adding three numbers is only slightly slower than adding two numbers, so we get the rounded result much more quickly by using injection rounding than if we added two significands, examined L, G, and S, and then incremented our result according to the rounding mode.

Implementing Injection Rounding

For FP, the rounding injection is one of three different values, values which depend on the rounding mode and (sometimes) the sign of the result.

Both RNA and RNE require us to inject a 1 at the G position (this is like adding $0.50 in our dollars and cents example).

RP and RM rounding depends on the sign as well as the mode. RP rounds positive results up (increases the magnitude of the significand towards positive infinity), but truncates negative results (picking the significand that is closer to positive infinity). Similarly RM rounds negative results up (increasing the magnitude of the significand toward negative infinity), but truncates positive results (picking the significand that is closer to negative infinity). Thus we split RM and RP into two cases: round up (RU) when the sign matches the rounding direction, and truncation (RZ) when the sign differs from the rounding injection. For RU cases we inject a 1 at the G-bit location and at every location that contributes logically to S (this is like adding $0.99 in our dollars and cents example).

For RZ and RX modes, and for RP and RM modes that reduce to RZ mode, we inject zeros.

For most of the rounding modes, adding the rounding injection and then truncating gives the correctly rounded result. The two exceptions are RNE and RX, which require us to examine G and S after the addition. For RNE, we set L to 0 if G and S are both zero. For RX we set L to 1 if G or S are nonzero.

FP Number are not Real Numbers

It's tempting to think of FP numbers as being just like real numbers, but they are fundamentally different, even for the most basic properties:

They are not associative. For example, in SP we can add 3 numbers and return 1 million or zero, perhaps not what people think of as a rounding error:

$(2^{45}+-2^{45})+2^{20}=2^{20}$ $2^{45}+(-2^{45}+2^{20})=0$

They don't obey the distributive laws. Again in SP:

$3,000,001*(4.00001+5.00001)=0x4bcdfe83$ $(3,000,001*4.00001)+(3,000,001*5.00001)=0x4bcdfe82$ and things get even worse in the presence of overflow:

$2^{50}*(2^{78}-2^{77})=2^{127}$ $(2^{50}*2^{78})-(2^{50}*2^{77})=\text{infinity}$ For some implementations, they aren't even commutative unless we are in default NaN mode (a mode that converts all NaNs to a single NaN), because in general nanA+nanB !=nanB+nanA. Numeric adds and multiplies are commutative.

Because of IEEE NaN rules, there are no multiplicative or additive identities. One and zero work as identities for numeric values.

One useful way to think of FP numbers is to consider them to be very long fixed-point numbers in which at most a few (53 for DP) consecutive bits can be nonzero. For example, non-infinite DP numbers can have the first bit of the significand in any of 2046 places, and that first bit is followed by 52 other significand bits, and there is a sign bit, so any finite DP number can be represented as a 2046+52+1=2099-bit fixed point number. Examined this way it becomes very obvious that adding two FP numbers does not, in general, result in another FP number: the result of the addition has to be rounded so that it becomes an FP number.

A known issue with floating-point (FP) arithmetic is that it is non-associative, a fact that makes sums problematic:

programmers need to worry about wildly different results, even when adding 3 numbers programmers use wider formats than they need, in the hope of avoiding the wildly different results programmers can't easily parallelize code, because sums aren't reproducible unless computed in the exact same order.

For example, in single precision, $2^{20}+(-2^{44}+2^{44})=2^{20}$ but $(2^{20}+-2^{44})+2^{44}=0$ Depending upon the order the operations are performed, the result is one million or zero. This is an extreme example because the exponents differ by 24, but we can get different answers if the exponents differ by 1, or even if all of the exponents are the same and we are adding more than 3 things. The C programming language addresses the reproducibility problem by requiring sums to be evaluated left-to-right, in order, but this does nothing for correctness, and makes parallelization impossible.

The problems are especially acute for high-performance computing (HPC), where programs may need to add millions of things. Programmers would like to parallelize these problems, but then the lack of reproducibility makes debugging even harder than it usually is. Different configurations of machines will produce different answers even if the reprogramming for those machines is done perfectly.

HPA Representation

A new datatype has been proposed that allows fast and correct accumulation of floating-point (FP) numbers in a programmer-selectable range. For the modest ranges that will accommodate most problems, the accumulation is faster than FP addition, and is associative. Associative addition allows the problems to be parallelized while still giving reproducible and correct results, enabling speedups by, for example, a factor of 100 or more as compared to existing hardware. We believe these benefits will be irresistible in the high-performance computing (HPC) space, and compelling for many non-HPC applications.

FIG. 1 schematically illustrates a data processing apparatus 2 for performing data processing operations under control of program instructions. A data processing apparatus 2 comprises a memory 4 storing program instructions 6 and data 8 to be processed. A processor core 10 is coupled to the memory 4 and includes a register bank 12, processing circuitry 14, an instruction fetch unit 16, an instruction pipeline unit 18 and an instruction decoder 20. It will be appreciated that in practice the data processing system 2 may include many additional elements and that the representation of FIG. 1 is simplified to aid understanding. In operation, program instructions 6 are fetched from the memory 4 by the instruction fetch unit 16 and supplied to the instruction pipeline 18. When the program instructions reach the appropriate stage within the instruction pipeline 18 they are decoded by the instruction decoder 20 and generate control signals which serve to control the operation of the register bank 12 and the processing circuitry 14 to perform the processing operation(s) specified by the program instruction decoded. Multiple input operands may be read from the register bank 12 and supplied to the processing circuitry 14 where they are manipulated and then a result value written back into the register bank 12.

The register bank 12 can have a variety of different forms. The operands to be manipulated may, for example, include floating-point operands, fixed point operands, integer operands and HPA or RHPA number operands (as will be described later). The register bank 12 may serve to store a mixture of these types of operands depending upon the configuration of the register bank 12. The operands can have differing levels of precision, as may be predefined by their format, or as may be programmably specified using metadata associated with the registers as will be described later in relation to the HPA number operands.

As shown in FIG. 1, the register bank 12 may include metadata registers 22 for specifying metadata associated with an HPA or RHPA value stored in a corresponding data register of the register bank 12 (examples of the contents of the metadata are given below). In some cases, each data register may have corresponding metadata registers 22, while in other cases two or more data registers may share metadata specified by a single metadata register 22.

Figure 2:
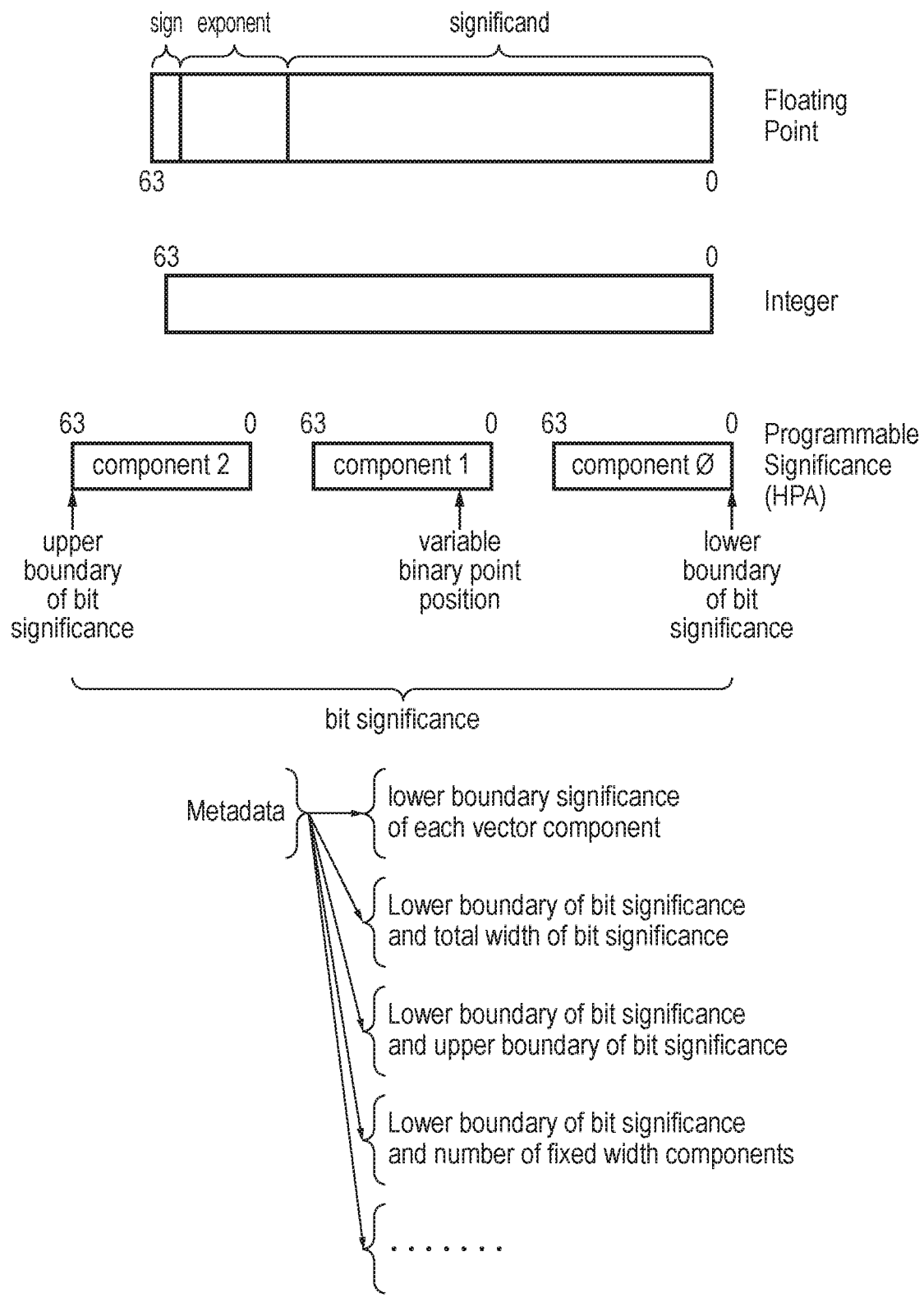
FIG. 2 schematically illustrates different representations of numeric values.

FIG. 2 schematically illustrates a floating-point operand. A floating-point operand is formed of a sign, an exponent and a significand. Floating-point operands can represent values with a wide variety of magnitudes indicated by their exponent values. The precision with which a number can be represented is limited by the size of the significand. Floating-point operations typically are more complex and slower to implement than integer arithmetic.

FIG. 2 also illustrates a 64-bit integer operand. Such an integer operand can represent numbers in the range 0 to $(2^{64}-1)$ for unsigned integers, or $-2^{63}$ to $2^{63}-1$ for signed integers. Integer arithmetic is typically quick and consumes comparatively little energy to perform (compared to floating-point arithmetic), but suffers from the disadvantage that numbers of a comparatively limited range of values may be specified compared to the range of numbers which may be represented by a floating-point value.

FIG. 2 also illustrates an HPA (high-precision anchor) number comprising a vector of multiple components (in this example three) each comprising a 64-bit integer in this example. The HPA number has metadata associated with it. The metadata includes an anchor value indicating a significance of the bits of the components forming part of the HPA number. The anchor value(s) specifies directly, or indirectly, a lower boundary of the bit significance and an upper boundary of the bit significance. The term metadata used below can be considered to correspond to data including the anchor value(s) that specify the bit significance of an HPA number. The different components together specify the bit values which contiguously span this range of bit significance. Depending upon the position of the lower boundary of the bit significance and the upper boundary of the bit significance, the range of bit significance may include the binary point position. It is also possible that the binary point position may lie outside of the range of bit significance specified for a particular HPA value.

The anchor value(s) may be provided so that they are capable of representing a range of bit significance extending from a smallest significance that can be represented by a floating-point value (e.g. a double precision FP value) up to a highest bit significance that can be represented by that floating-point value.

The number of components which form the HPA number can vary between different implementations. The size of the components may be fixed in some embodiments, but in other embodiments may vary. The overall width of the range bit significance may in some embodiments be constrained to change in units of a fixed component size (e.g. with 64-bit components, the range of the bit significance may have a width of, for example, 64, 128, 192, 256, . . . ). It is also possible that the width of the range of bit significance could vary continuously in steps of one bit width.

The anchor value(s) (within the metadata) may be programmable, so that the programmer can set the significance of the corresponding HPA value. The anchor value may specify the bit significance in a variety of different ways. One example is to specify the lower boundary bit significance of each vector component. Thus, each vector component may comprise an integer value representing its portion of the significant bits of the value within the overall range of bit significance together with metadata representing (anchoring) the significance of the lowest bit within that component. Another option is that the anchor value(s) specifies the lower boundary of the bit significance of the whole HPA number together with the total width of the range of bit significance. A further option is that the anchor value(s) may comprise data specifying the lower boundary and the upper boundary of the range of bit significance. Still further variations are also possible, such as anchor value(s) comprising the lower boundary of the range of bit significance together with the number of the components where those components are known to be fixed width components.

Figure 3:
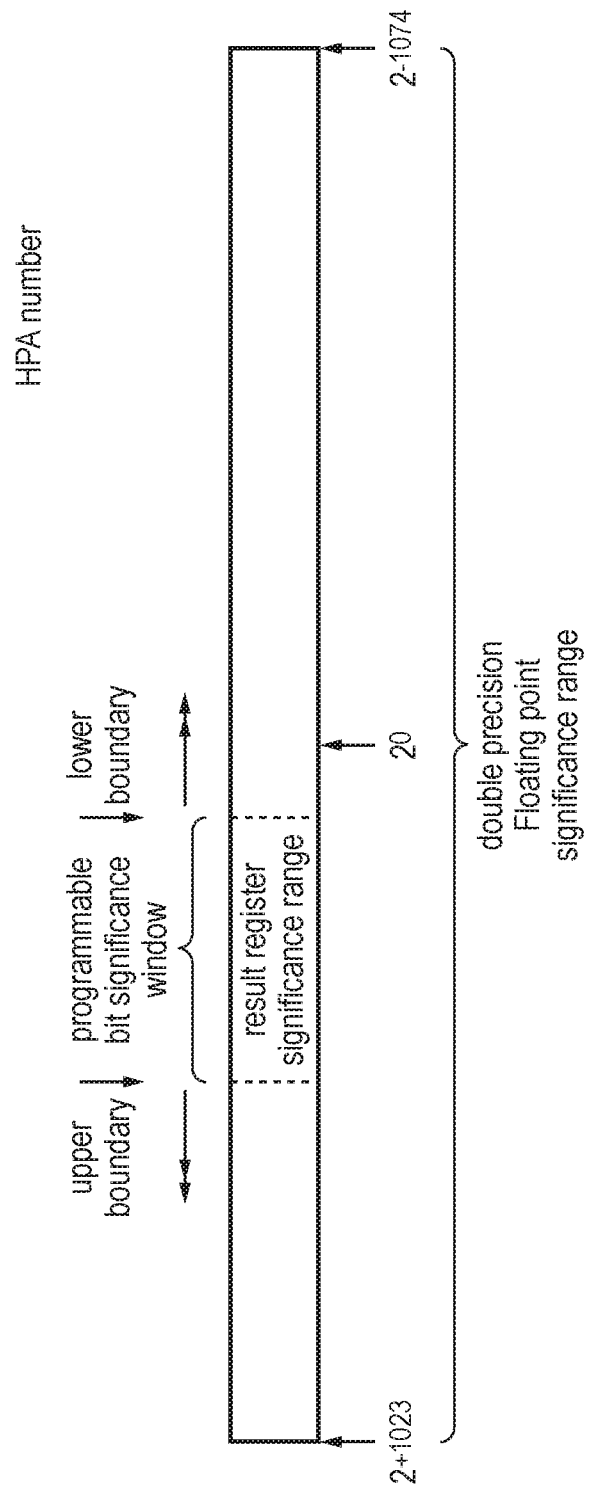
FIG. 3 schematically illustrates an example of a relationship between a double precision floating-point value and a high-precision anchor (HPA) value.

FIG. 3 schematically illustrates a relationship between the range of values representable with a double precision floating-point and the significance range of an HPA number. In the case of a double precision floating-point number, the range of bit values which may be specified extends from approximately $2^{-1074}$ to $2^{+1023}$ (not counting subnormals).

As illustrated, the HPA number has a programmable bit significance range which may be considered as a window of bit significance within the range of bit significance representable using the floating-point value. This programmable bit significance may be specified by a lower boundary and an upper boundary, and depending upon the values of the lower boundary and the upper boundary, may be considered to slide along the range of bit significance provided by the floating-point value. The width of the window, as well as its starting point and ending points, may be specified by appropriate values of the programmable metadata (that includes the anchor value(s)) which specifies the bit significance. Thus the HPA number may have a form selected by the programmer to match the computation to be performed.

The HPA format allows additions of two or more values to be performed fast, exactly and associatively, while still permitting values over a broad range of significance to be represented. Since the HPA value is simply a two's complement number it can be added using an integer adder and there is no need for rounding or normalisation as with floating-point arithmetic, which allows a series of additions to be parallelized because the result will be the same regardless of the order in which the values are added. Nevertheless, by defining metadata specifying a programmable significance of the HPA value, then the full range of significance of an equivalent floating-point value can still be represented, but without needing to provide a very wide adder (e.g. to add two 2's complement numbers across the full range representable by double precision floating-point values would require a 2098-bit adder), and instead the programmable significance enables a smaller adder to focus on a particular window of programmable bit significance within the larger range. In practice, most calculations do not require the entire range of significance available for double precision floating-point. For example, sub-atomic problems might accumulate very small values and astronomic complications might accumulate very large values, but it is not generally useful to add the width of a proton to the distance between galaxies. Even for high-performance computing, most accumulations happen over a limited range.

Typically, the programmer writing a program will know the expected range of values in which useful results are likely to fall (depending on the application). The programmer might determine that all of the data for a particular sum will have a magnitude less than $2^{60}$ and that values with magnitude below $2^{-50}$ will not affect the sum in any meaningful way, and so in this case by adding the data using the HPA format with an overall data width of 128 bits and the anchor value specifying the significance of the least significant bit as −50, the numbers for this particular application can be added associatively in any order.

Hence, by using the anchor value to limit the significant range for which the result is being calculated, a relatively small piece of hardware can be used to calculate the result within the programmably defined window. If an addition results in overflow above the upper significance boundary or underflow below the lower significance boundary of the defined range, then an exception can be raised and this can signal that the programmer has defined the wrong significance boundaries and that the processing should be repeated with different metadata (e.g. a different anchor value or a different overall size of the HPA value) to define a different window of significance for the result.

When adding or subtracting two HPA values, the anchor value is the same for both HPA values and the result also has the same anchor value—this is unlike floating-point arithmetic where the addition or subtraction of two values can lead to a result with a different exponent to either of the inputs due to normalisation of the result. If the inputs are provided with different anchor metadata then they are shifted to align themselves with the required target significance range for the result. If the inputs are provided in a representation other than HPA (e.g. integer or floating-point), then they are converted into HPA values sharing the same anchor value, and added to form a result having the same anchor value. Hence, the metadata for an HPA register can be viewed as defining a target range of significance for the result value to be generated in that register, and bits outside the target range of significance will not be calculated by the hardware regardless of the actual significance of the input values.

RHPA Representation

While the HPA format enables much faster additions compared to floating-point, when the size of an HPA value becomes relatively large then adding two HPA values with integer arithmetic may still be relatively slow. For example, the HPA format may require addition of operands spanning multiple lanes, which may be undesirable in larger vector implementations. For example, addition of two 256-bit or 512-bit values may take some time because each 64-bit lane of addition may be performed sequentially to accommodate carries from one lane being input to the following lane.

The addition can be performed faster by using the Redundant High-Precision Anchor (RHPA) format shown in FIG. 4. As in the HPA format, the RHPA number includes a variable number of components with metadata defining an anchor value which enables the processing circuitry 14 to identify the significance of bits of each component. Again, the anchor value may be programmable. For RHPA, the metadata may identify the significance of each component in any of the ways described above for HPA. However, in the RHPA format, the numeric value is represented using a redundant representation where adjacent lanes of the vector include bits of overlapping significance, which allows constant-time addition regardless of the number of lanes being calculated. The redundancy enables operations such as addition, accumulation and multiplication to be carried out with shorter adders and without propagating carry information between adders. This greatly speeds up processing of data values.

As shown in part (1) of FIG. 4, an M-bit data value using the RHPA representation is divided into respective vector lanes (also referred to as components, elements or portions) each comprising N bits, where N<M. In this example N is 64 bits, but this is just one example and other lane sizes (e.g. 32 or 128 bits) are also possible. Each N-bit portion is divided into a certain number V of overlap bits and N-V non-overlap bits. In this example, the number of overlap bits V is the same for each N-bit portion, but it is also possible to have different N-bit portions with different numbers of overlap bits.

When an integer or floating-point number is converted to RHPA format, some of the non-overlap bits are populated with non-sign information mapped from the original integer or floating-point number, while the overlap bits are populated with sign bits. For lane-based addition and subtraction purposes each lane behaves like an N-bit signed two's complement number (with carries propagating from the non-overlap portion to the overlap portion if necessary), but when viewed from a multilane perspective the lanes form a redundant mixed-sign representation of a larger P-bit number. In the example of FIG. 4 there are four lanes and so M=256, but the number of lanes can vary depending on the hardware implementation and/or the metadata defined for a given RHPA number.

Part (2) of FIG. 4 shows the relative significance of each bit of the RHPA number shown in part (1). The overlap bits V[0] of the least significant lane have the same significance as the V least significant bits of the non-overlap bits NV[1] of the next lane. Likewise overlap bits V[1] and V[2] have the same significance as the V least significant bits of non-overlap bits NV[2] and NV[3] respectively. The overlap in significance between lanes means that the RHPA number as a whole represents a P-bit value which is smaller than the total number of stored bits M. If V is the same for each N-bit portion (other than the top portion), then $$P = M - V\left(\frac{M}{N} - 1\right).$$

More generally, if different lanes can have different numbers of overlap bits, P=M−ΣV, where ΣV is the total of the number of overlap bits in each lane other than the top lane.

In each overlapping portion of the P-bit value, the actual bit values of that P bit number are represented by the sum of the overlap bits V of the lower lane and the non-overlap bits NV in the higher lane (taking into account any carries that may be caused by adding the non-overlap bits NV and the overlap bits in lower lanes). Hence, one way of converting the RHPA value to an equivalent integer value is shown in part (3) of FIG. 4, where the overlap bits in each lane are sign-extended and added to the non-overlap bits of the higher lane (from low order to high order, adjusting the overlap bits after each lane addition).

The RHPA number is redundant in the sense that there is more than one way to represent a given P-bit number using the M bits of the RHPA value. For example considering the overlap in the lowest two lanes, in an example where the number of overlap bits V=4, if the corresponding bits of the P-bit value are 1111, then one way to represent this would be to have the overlap bits V[0]=0b0000 in the lower lane and the non-overlap bits NV[1]=0b1111 in the next highest lane. However, other ways of representing the same values could be V[0]=0b0101 and NV[1]=0b1010, or V[0]=0b1111 and NV[1]=0b0000, say.

Note that the overlap bits V[3] in the highest lane are not really overlap bits because there is no higher order lane to overlap with. Hence, it can often be useful to consider the high order lane as having all non-overlap bits. Hence, in some cases the top lane may be considered to be formed entirely of non-overlap bits (so that the most significant bit of the P-bit value as a whole corresponds to the most significant bit of the M-bit value in the top lane).

However, in other embodiments, it may be preferable to treat the top lane as having overlap bits too, so that the most significant bit of the P-bit numeric value represented by the RHPA corresponds to the most significant bit of the non-overlap portion (excluding the overlap portion) of the top lane. This approach may make circuit implementation easier if it allows each lane to be processed in a more symmetric manner (with fewer modifications to the way the top lane is processed compared to other lanes).

By representing a P-bit numeric value in a redundant form as shown in FIG. 4, several RHPA numbers can be added without carries between lanes, because any carries from additions of the non-overlap portions in a given lane can be accommodated within the overlap portion of the same lane, without needing to propagate carries through to the next lane. The addition performed in each lane simply sees two or more N-bit signed integers which are added by performing a conventional N-bit two's complement addition, which is entirely independent of the corresponding N-bit additions in other lanes. This means that each of the N-bit additions can be performed in parallel, so that regardless of the number of lanes, the entire M-bit values can be added in the time taken to perform a N-bit addition.

In fact, at least $(2^{V-1}-1)$ such RHPA numbers can be added without carries between lanes, with any carries from the addition of non-overlap portions being collected in the overlap portion (if there are lanes having different numbers of overlap bits, then V in this expression would be the minimum number of overlap bits in any given lane having overlap bits). The $(2^{V-1})$th addition would be the first that could possibly generate a carry between lanes (because the top overlap bit is a sign bit, lane overflow occurs when there is a positive or negative overflow from the second most significant overlap bit, which when starting from an RHPA number where all the bits are 0 can occur after a minimum of $2^{V-1}$ further additions have been performed). For example, if V=14, this would allow at least 8191 RHPA numbers to be added to the accumulator (i.e. 8192 values added in total) before there is any risk of overflow from a single lane. This is particularly useful for the high performance computing field where addition of many input values is common. In practice, as not every addition will cause a carry into the overflow portion, sometimes more than $2^{V-1}$ accumulations are possible without overflow from the top bit of the N-bit portion.

Occasionally, if enough additions have been performed to cause a risk of overflow (or an actual overflow) from the top bit of an N-bit lane, then an overlap reduction operation can be performed to convert a given RHPA value to a second RHPA value in which the overlap bits represent a smaller magnitude than the overlap bits of the given RHPA value, to effectively free up bit space in the overlap portions for accommodating more carries. Also, when converting an RHPA number back to another format such as integer or floating-point, such overlap reduction may also be performed. However, in practice, such an overlap reduction operation may not be required often, and so by allowing M-bit additions of multiple inputs to be performed in the time taken for an N-bit addition, RHPA enables a great saving in processing time. Note that the term "overlap reduction" does not imply that the overlap bits in every lane must be reduced to a smaller magnitude. It is enough that at least one lane has its overlap bits reduced in magnitude, and it is possible that some forms of overlap reduction could lead to overlap bits in a given lane increasing in magnitude.

Efficient Storage and Manipulation of HPA Numbers

For the following description, it will be assumed that the HPA form used is the above discussed RHPA form where each portion includes a number of overlap bits, but the techniques described herein are equally applicable to other HPA forms, for example HPA forms where the different portions do not include overlap bits. Hereafter, the term HPA will be used to refer to the HPA values being manipulated, irrespective of whether they are in redundant form or not.

As will be apparent from the earlier discussed FIG. 4, the different HPA portions of an HPA number may be located within different lanes of a single vector register. However, this gives rise to a number of potential issues. For example, when creating the HPA form from a floating-point operand, the fraction of the floating-point operand needs to be propagated to all of the lanes within the relevant vector register, along with a desired anchor value. Each lane will then have a different lane anchor based on the anchor value. Further, it can result in wasteful use of the vector register resource, in situations where the vector registers are significantly larger than the long integer value of the HPA number, for example where a 1024-bit register holds a 200-bit long integer of an HPA number. Further, processing can be problematic if a vector register has an insufficient number of bits to represent all of the portions of the long integer of the HPA number, for example if the vector register is 128 bits wide and a 200-bit long integer of an HPA number needs to be represented.

In the examples discussed hereafter, an alternative storage arrangement is provided for the various portions of an HPA number. In particular, the long integer of an HPA number is arranged so as to be stored within a common lane across multiple vector registers, as illustrated schematically in FIG. 5A. In particular, a set of vector registers 100 are provided, where each vector register can be considered to consist of a plurality of sections for storing data values. Further, a plurality of lanes can be considered as extending through the vector registers (in a vertical direction in the orientation illustrated in FIG. 5A), the first four lanes being denoted by the reference numerals 102, 104, 106, 108 in FIG. 5A. The long integer of an HPA number can then be stored within a common lane by storing different portions of the HPA integer value in different vector registers. This is illustrated schematically for the example HPA integer 110, which is considered to consist of four portions, one portion being stored in each of the vector registers Z0, Z1, Z2 and Z3. Further, all of the portions are stored within the common lane 102. By storing the integer of the HPA number in this way, this gives rise to a number of significant benefits. For example, the size of the integer is not constrained by the width of an individual vector register. Further, inefficient utilization of the vector registers can be avoided, since multiple HPA integers can be stored in different lanes across the various vector registers, with those integer values then being able to be operated on in parallel in a SIMD fashion. For example, considering FIG. 5A, if each of the vector registers shown in FIG. 5A were to provide 16 lanes, then 16 HPA numbers can be stored within the four vector registers Z0 to Z3, each HPA number occupying a different lane. Hence, it can be seen that this approach significantly improves scalability and provides a technique which is vector length agnostic. This hence allows the technique to be adopted in a wide variety of different systems, each of which may operate using different sized vector registers. There are hence many applications where the use of such a storage technique for the HPA values will give rise to significant performance benefits, but one example is in association with systems adopting the Scalable Vector Extension (SVE) proposed by ARM Limited.

ARM Limited has announced the Scalable Vector Extension (SVE) to its 64-bit ISA, targeted at scientific HPC applications. While SVE does not currently include HPA support, it is continuing to evolve, and a few modest additions to its instruction set would enable very high HPA performance. The "scalable" part of SVE refers to it not requiring the same vector length for all implementations: SVE vectors can be implemented in hardware as any multiple of pairs of 64-bit lanes, from 128 to 2048 bits. A small chip might only implement 128-bit vectors, while a supercomputer might implement 1024 or even 2048-bit vectors. Holding a 200-bit integer within a single SVE register would be impossible on a 128-bit implementation, and wasteful on a 2048-bit implementation, but holding some number of 200-bit integers spread across 4 of these registers takes full advantage of the scalability of SVE, and works well on any hardware implementation, from small to large. It also frees the programmer to use shorter or longer integers as required: 100-bit integers could fit in corresponding lanes of 2 vector registers, and 500-bit integers could fit in corresponding lanes of 10 vector registers.

For performance and area reasons, SVE performs arithmetic within 64-bit lanes. We propose doing HPA addition by breaking large i HPA numbers into smaller redundant pieces. Each 64-bit lane will hold a specified part of i (say p=50 bits, but this can be programmable), with the remaining 64-p bits used to keep carries within a lane. These remaining bits are referred to as "overlap" bits because they have the same numerical weight as the lsb's of the next most significant lane. The addition within a lane is just a normal 64-bit integer addition. Every $2^{64-p}$ cycles, (i.e. every 16,000 cycles or so for p=50), a redundancy elimination step may be required to prevent lane overflow, and at the end of every computation a lane-by-lane process will be required to obtain a non-redundant answer.

In order to convert an FP input f, to an HPA number format (i, a), each 64-bit lane examines the exponent off, compares it to the anchor a, and then determines if any part of the significand off should be added to the portion of i under consideration. This comparison may be done in parallel across all applicable lanes. While the significand of f might span two portions (or three portions for FP64 products, depending on the value of p), each portion can be created and manipulated independently.

An example conversion of an FP32 number into a two portion HPA with a chosen to be 0 and p chosen to be 50 is set out below. In this example, the FP32 number is assumed to occupy the "right-hand" 32 least significant bits of a vector register lane, and HPA numbers are assumed to occupy 64-bit register lanes (including a 50-bit value and 14 overlap bits). If the FP number is:

$f$=+1.0110 1011 1010 0010 1111 011×$2^{60}$ FP32 significand,$f$[23:0]=1 0110 1011 1010 0010 1111 011

Portion 1 of the HPA number will have an adjusted portion anchor=50 and is computed as follows:
i[1]=f[23:0] left shifted by (exponent −23)−portion anchor=37-50=−13 places (−ve left shift is +ve right shift→i [1]={{14 0's}, {39 0's}, f[23:13]=1 0110 1011 101} (the adjustment of the exponent by 23 takes account of the fact that the exponent of a floating-point value represents the significance of the implied decimal point to the left of the most significant bit of the 23-bit fraction, whereas the anchor represents the significance of the least significant bit of the fraction).

The Portion 0 of the HPA number will have an adjusted portion anchor=0 and is computed as follows:
i[0]=f[23:0] left shifted by (exponent−23) −portion anchor=37−0=37 places−>i[1]={{14 0's}, f[12:0]=10 0010 1111 011, {37 0's}}

Figure 5A:
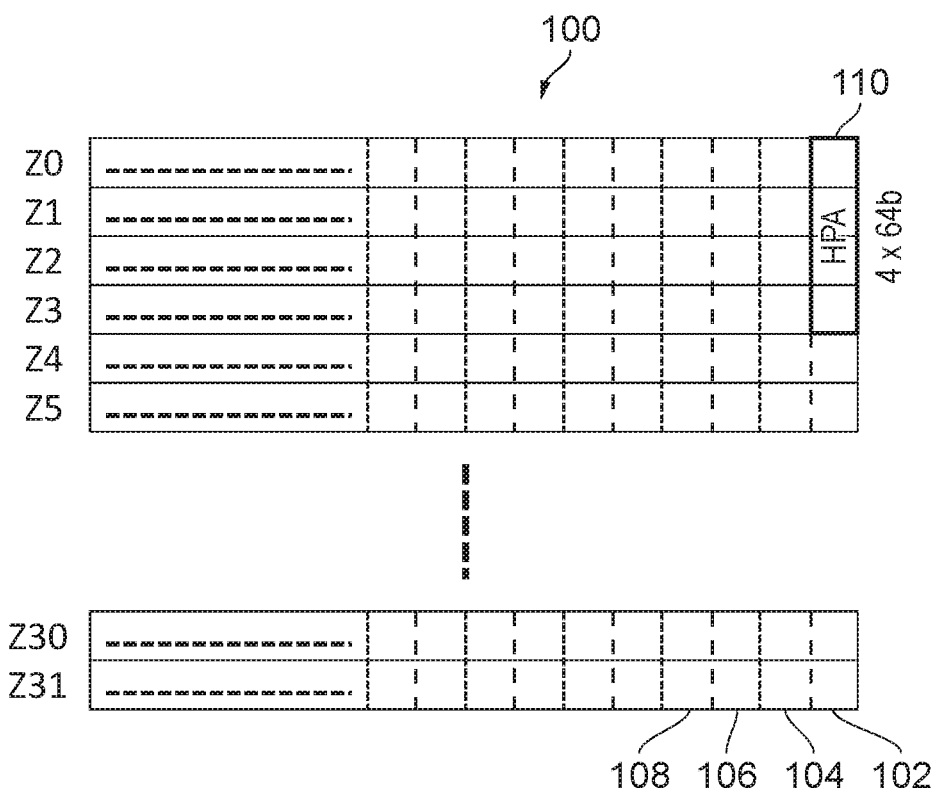
FIG. 5A schematically illustrates how an HPA integer may be stored within a selected lane across multiple vector registers, in one example.
Figure 5B:
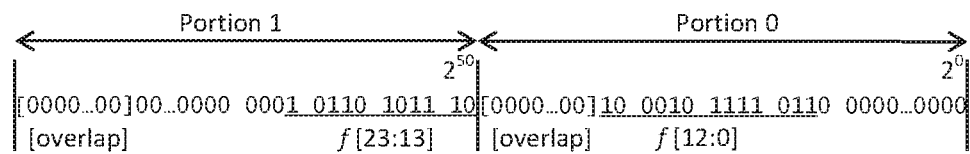
FIG. 5B shows an example of HPA form.

This results in the HPA form as shown in FIG. 5B.

Generally speaking, correctly rounding an HPA result to a single FP result has to be a sequential process, requiring lane-by-lane propagation of carry and rounding information. It would require several cycles, but only has to happen once for each accumulation. Alternatively, if p≤53, a non-redundant HPA number occupying several 64-bit lanes could be converted in parallel to a vector of FP64 numbers. The resulting vector should then be "renormalized" so that the most significant element represents the full HPA number to an accuracy of 0.5 ulp.

Having now described the fundamentals of HPA processing at a high level, we now describe in greater detail how an HPA accumulator might be implemented in SVE. SVE supports vector register lengths of k×128 bits up to a current maximum of 2048 bits (i.e. 1≤k≤16) and is based on the concept of "Vector-Length Agnostic" (VLA) processing, whereby different CPUs with different SVE vector register lengths can all run the same SVE program. An SVE program reads the available vector length from a system register and "self-adjusts" to exploit the available vector register length. Consequently, SVE programs execute within 128-bit granules with the CPU processing as many granules in parallel as the available vector hardware length can support.

As mentioned earlier with reference to FIG. 5A, to achieve vector-length agnosticism, HPA numbers may be laid out across multiple SVE registers. Each register may hold bits of the same significance of different HPA numbers: that is, each register is associated with a significance that gives the value of the number's anchor adjusted relative to each portion's position in an HPA number.

Returning to the earlier example of a 200-bit HPA number with p=50 bits held in each portion, if the anchor of the HPA number is −80, the significance information for the four portions would be (+70, +20, −30, −80) with 14 overlapping bits per 64-bit portion. Note that there is no need for the individual portions of the HPA number to be stored in contiguous registers as per the example in FIG. 5A.

The primary advantage of laying out HPA numbers in this way is that they (or long integers) can be dealt with in SIMD fashion, even across SIMD implementations (e.g. 128-bit vectors) that may be shorter than the long HPA numbers. A secondary advantage is that longer SIMD implementations (e.g. 1024 bit vectors) are not wasted by storing much shorter HPA numbers within each vector. Provided that there are sufficiently many integers or HPA numbers, the vectors are fully utilized regardless of the SVE implementation length.

Laying out HPA numbers across several registers also allows HPA arithmetic to be highly parallelized with vectors of FP numbers being accumulated within their own 64-bit lanes. In addition, loading large quantities of FP numbers from memory reduces to simple and efficient contiguous vector loads. Finally, this layout of HPA numbers allows existing SVE instructions to be used to perform important HPA computations (such as eliminating redundancy or adding HPA numbers together) because a number of HPA integers can all be processed in parallel from low-order bits to the high-order bits. The scheme also speeds up the conversion and renormalization of HPA numbers to FP, again because multiple HPA numbers can all be processed simultaneously from high-order lanes to lower-order lanes, or low-order lanes to high-order lanes.

Figure 6:
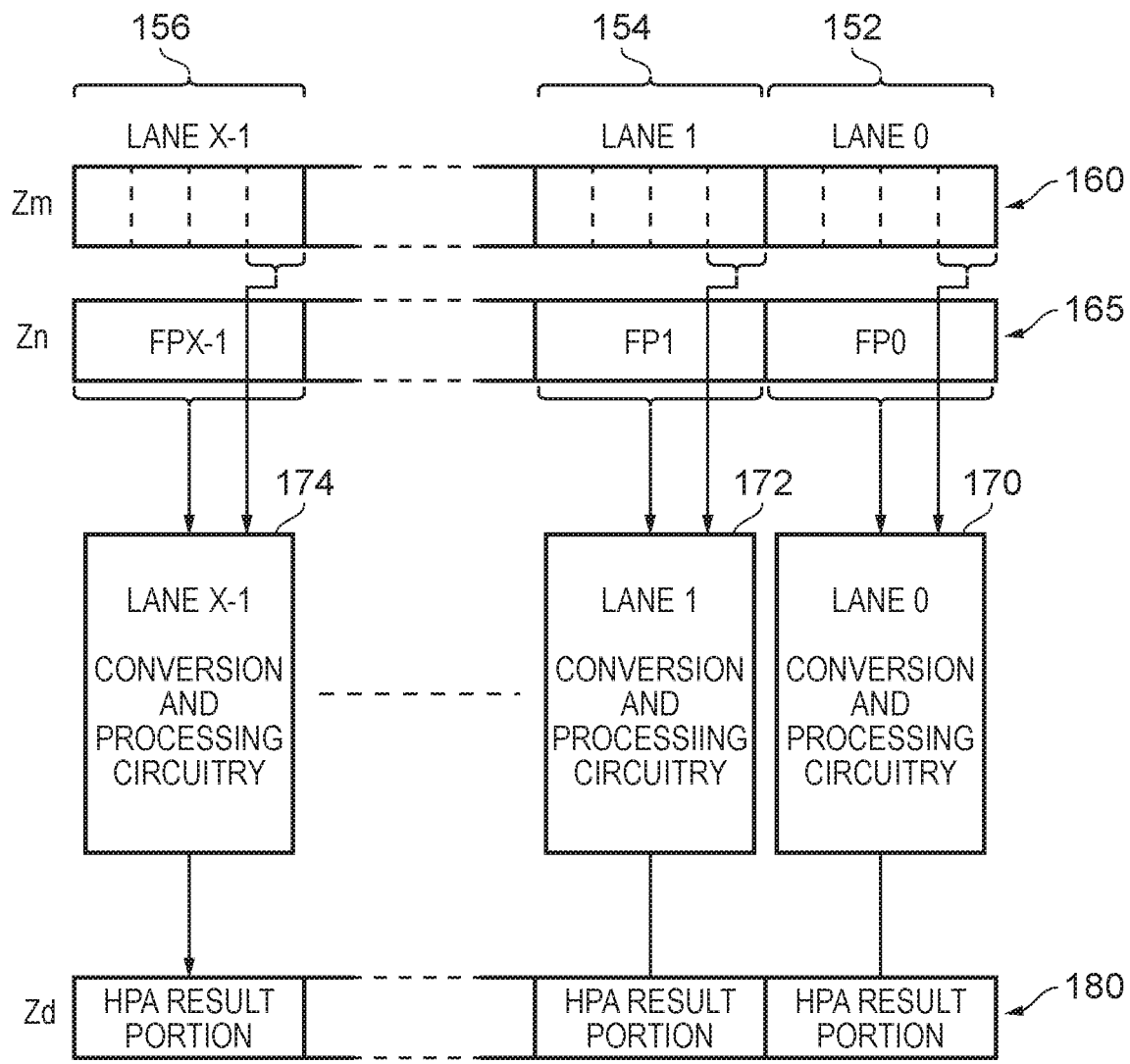
FIG. 6 is a block diagram schematically illustrating how floating-point numbers may be converted into HPA form and processed, in accordance with one example arrangement.

FIG. 6 illustrates how HPA numbers laid out in the manner discussed in FIG. 5A can then be processed in a SIMD manner. In this particular example it is assumed that a series of floating-point numbers are loaded into a source vector register 165. In this example, it is assumed that each floating-point number is a double precision floating-point number, and hence each floating-point number occupies a 64-bit section within the source register 165.

A plurality of 64-bit lanes 152, 154, 156 are considered to extend through the set of vector registers, and separate conversion and processing circuits 170, 172, 174 are associated with each lane. The circuits 170, 172, 174 are arranged to operate on a single portion of an HPA number at a time in order to produce a corresponding result portion to be stored in a destination register 180. It will be understood from the earlier discussed FIG. 5A that each result portion of an HPA result number will occupy a different destination register, and accordingly as the circuits process different portions of an HPA number the corresponding result portions will be written in different destination registers.

As will be discussed in more detail later, metadata is provided for reference by the conversion and processing circuits 170, 172, 174 when performing their conversion and processing steps. In particular, in this example metadata is stored for each lane within a further source register 160. Within a lane's metadata, a metadata portion is provided for each portion of the HPA numbers processed within that lane. The metadata will identify the significance (adjusted anchor) associated with the corresponding portion, and may identify other information, such as the number of overlap bits. When the circuits 170, 172, 174 are processing a particular portion of an HPA number, they will retrieve the associated metadata portion from the lane metadata maintained within the source register 160.

In the example shown in FIG. 6, each conversion and processing circuit will receive an input floating-point operand and the relevant metadata portion for the portion of the HPA number that is to be processed, and will then generate the relevant HPA portion from the input floating-point operand using for example the technique described earlier with reference to the example shown in FIG. 5B. The generated HPA portion could then be stored directly in the result register 180, or may be subjected to some processing function in order to generate the associated result portion. For example, in one embodiment an accumulation operation can be performed, where a current HPA result portion is retrieved from the destination register and then accumulated with the HPA portion generated from the input floating-point operand in order to produce an updated result portion that is then written back into the relevant section of the destination register 180.

By such an approach, it can be seen that via the performance of multiple iterations, multiple accumulate operations can be performed within each of the lanes in parallel in order to generate result portions representing the accumulated result. The process can also be repeated for each of the portions of the HPA number in order to produce a series of result portions within each lane, that collectively represent a result HPA value.

Figure 7:
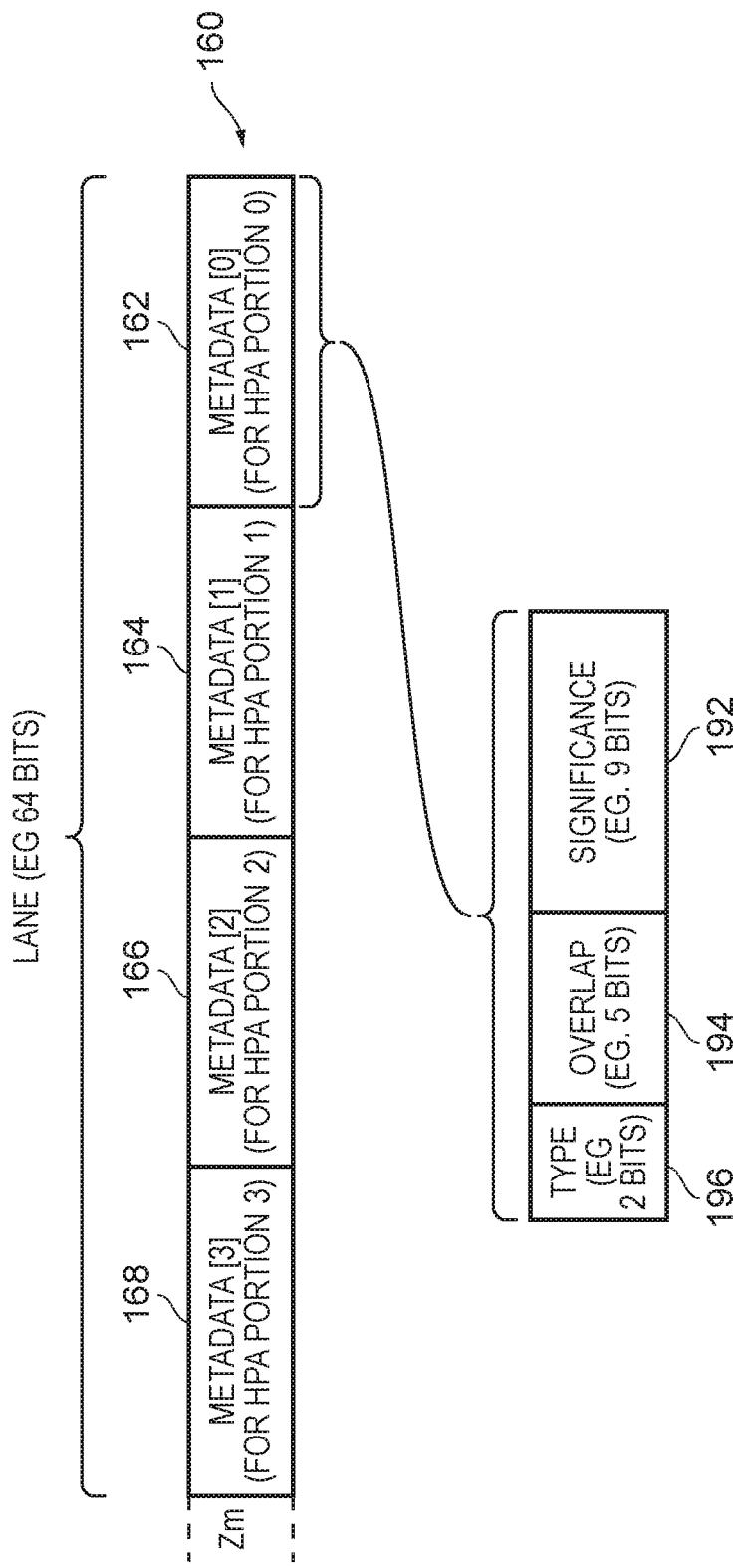
FIG. 7 schematically illustrates the form of metadata that may be used in one example.

In one example arrangement, the HPA processing requires information ("metadata") about the anchor, lane overlap and lane type or position within a wide number—top, bottom, or intermediate. It is anticipated that HPA numbers will typically be no more than 200 bits wide with an anchor range similar to IEEE FP32 so that HPA accumulators will normally comprise no more than four portions. Then the HPA metadata for a 200-bit accumulator traversing 4 64-bit portions can be organized as 4 16-bit fields, as shown in FIG. 7.

In particular, a source register 160 can be specified, where within each lane (for example 64 bits) four metadata portions are provided as indicated by the reference numerals 162, 164, 166, 168. Each metadata portion can then provide the metadata for an associated portion of the accumulator result. As shown by the expanded section in FIG. 7, the significance (adjusted anchor) information can be contained in a first sub-portion 192, for example using 9 bits, whilst the overlap information can be captured in a second sub-portion 194, for example comprising 5 bits. If desired, type information can also be captured in a third sub-portion 196, to identify whether the associated portion is the top portion (i.e. representing the most significant bits), the bottom portion (representing the least significant bits) or an intermediate portion.

Within any particular lane, the HPA values that are accumulated will all be arranged to have the same anchor, and accordingly the metadata for a lane will apply equally to all of the HPA values processed within the lane.

In principle, different metadata can be specified for each of the lanes, so that the values processed in one lane do not have to have the same anchor as the values processed in another lane. However, it will often be the case that all of the values processed within all of the lanes will be arranged to have the same anchor value, and in this instance the 64 bits of metadata can be stored and replicated across the whole vector register 160. This enables the various HPA results produced for each of the lanes to in due course then be readily accumulated with each other in order to produce a single scalar HPA result.

In such an arrangement, the SVE instructions for HPA that need to reference the metadata can specify the metadata register along with a 2-bit pointer to the particular 16 bits of metadata for the HPA portion being processed.

It should be noted that, whilst FIG. 7 illustrates one mechanism for providing the metadata, alternate schemes for storing the metadata in a more compressed manner could also be devised so that, for example, 8 lanes of metadata can be stored in 64 bits. In particular, the "type" field might not be needed and the ovlp and significance fields could possibly be reduced in size to reflect a limited number of available configurations.

The single most important HPA operation is converting and accumulating an FP number into HPA format. This operation must be performed on every FP number to be accumulated, whereas other HPA operations (conversion back to FP, eliminating HPA redundancy, etc.) occur thousands of times less frequently. Consequently, it is desirable to provide efficient hardware support for converting and accumulating FP numbers.

Figure 8:
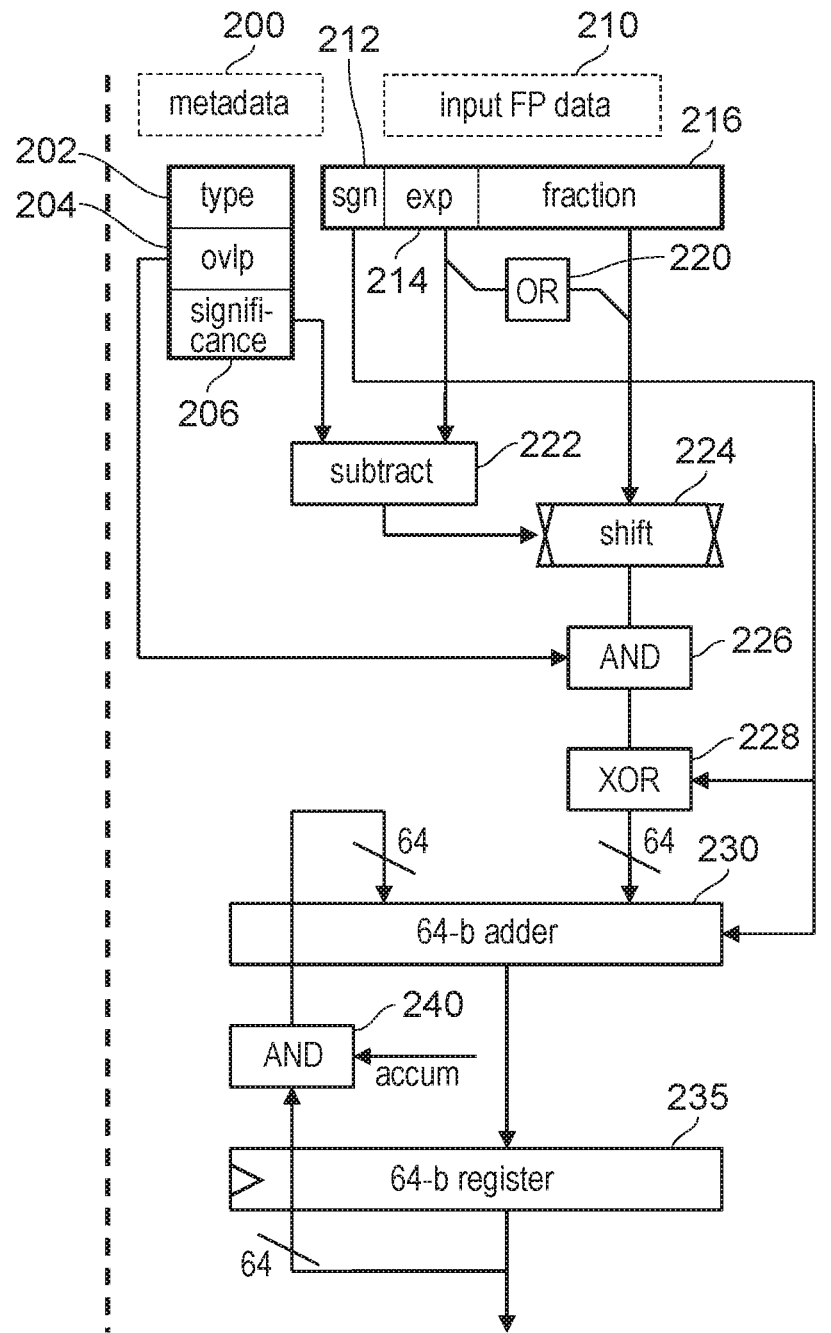
FIG. 8 is a diagram illustrating in more detail conversion and processing circuitry that may be provided in association with each lane, in one example.

FIG. 8 shows a possible 64-bit datapath for this operation that would be repeated across a vector unit, FIG. 8 hence representing in more detail an example configuration for each of the conversion and processing circuits 170, 172, 174 shown in FIG. 6.

Input floating-point data 210 consists of a sign portion 212, exponent portion 214 and fraction portion 216. The relevant metadata portion from the metadata held for a lane is then extracted as the metadata portion 200, this including a type field 202, an overlap field 204 and a significance field 206. The OR function 220 performs an OR operation on the bits of the exponent in order to generate the most significant bit of the significand, which is then prepended to the fraction bits 216 in order to form the significand. In particular, if the exponent is non-zero, this indicates that the floating-point number is a normal floating-point number, and accordingly the significand's most significant bit is a logic one value. However, if all of the bits of the exponent are zero, this indicates a sub-normal value, and accordingly the most significant bit of the significand should be set to zero.

The subtract block 222 is arranged to subtract the significance 206 from the exponent 214 (adjusted as necessary for exponent bias and fraction wordlength), for example using the technique described earlier with reference to FIG. 5B in order to produce a shift amount that is then used to control the shift circuitry 224 to shift the floating-point significand by the appropriate amount (performing either a right shift or a left shift as appropriate).

The AND circuitry 226 then receives the overlap information 204, and masks the output from the shift circuitry by the specified number of overlap bits (equal to 64-p). Thereafter, the XOR circuitry 228 performs a two's compliment function on the output from the AND circuitry 226 if the floating-point number was negative, as indicated by the sign value 212. At this point, the bits of the input floating-point number pertinent to a particular HPA portion with a given significance and overlap amount are available as a two's complement number, and can be provided as one input to the adder circuitry 230 (the adder also taking a carry-in value of 1 if the floating-point operand is negative). As a result, it can be seen that the relevant HPA portion can be generated "on the fly" from the input floating-point value, and then subjected to a suitable processing operation in order to generate a corresponding result portion.

In the example shown, it is assumed that the processing operation is a selective accumulate operation. In particular, the AND circuitry 240 can be used selectively to propagate the current value held in the register 235 back as a second input to the adder 230, allowing a previous result portion to be accumulated with the input operand portion output from the conversion circuitry, in order to produce an updated result portion stored in the register 235. Incorporating a 64-bit adder and register in the manner shown supports pipelined execution of back-to-back HPA convert-and-accumulate instructions.

There are a number of ways in which the circuitry illustrated in FIG. 8 can be triggered to perform the above described operations, but in one embodiment a single instruction is used to initiate the above described functionality of FIG. 8. Such an instruction can be referred to as an FP-to-HPA convert-and-add instruction.

The opcode for an FP-to-HPA convert-and-add instruction (mnemonic "FCVTH{A}", where {A} denotes optional accumulation) in one example includes identifiers for an FP source register, the metadata register, the destination accumulator register, and an index to select a sub-field of the metadata register. This fits well with an SVE ISA design principle that opcodes reference no more than three vector registers.

Short sequences of existing SVE instructions can be constructed that implement other important HPA operations.

Periodically, it is important to eliminate the redundancy of an HPA number in order to avoid portion overflow. This may be achieved by simply adding the accumulated carry bits in the overlap region of a lower HPA portion to the LSBs of the next highest HPA portion. In SVE this may be accomplished in a 3-instruction procedure:
  (i) Arithmetic Shift Right the lower portion by p places;
  (ii) Add the shifted overlap bits to the next higher HPA portion;
  (iii) AND immediate the overlap bits with a mask derived from p in the lower HPA portion to force them to zero.

This procedure may be applied to every pair of adjacent HPA portions, working up from the lowest lane.

After a large block of FP numbers has been accumulated, the result will be stored in multiple accumulators laid across a number of SVE lanes. These accumulators may then be added together to return a scalar result for each vector of HPA lanes with the same index. In SVE this may be readily achieved by performing a vector reduce on the accumulators held in multiple HPA lanes to form a scalar HPA result. The resulting scalar HPA number may well contain carry bits in the overlap regions of each portion, and hence the redundancy elimination routine can then be run on the scalar HPA number before converting it back to FP form.

Finally, the accumulated reproducible HPA result may be converted back to floating-point format. An algorithm for converting an HPA portion to a normalized FP64 number exactly (i.e. assuming that p≥53) is as follows:
  (i) perform a CLZ to locate the position of the leading '1'
  (ii) compute the exponent as significance+(63−CLZ)+ FP64 exponent bias
  (iii) for all but the highest HPA portion, set bit[63] of the FP64 result to 0; set bits [62:52] of the FP64 result to the calculated exponent; if the biased exponent>0, logically shift left the HPA portion by CLZ−11 places: otherwise set the FP64 result to zero.
  (iv) for the highest HPA portion only: if the portion is negative, set bit[63] of FP64 result to 1 and negate the portion to obtain a positive 2's-complement number; set bits [62:52] of the FP64 result to the calculated exponent; if the biased exponent>0, logically shift left the HPA portion by CLZ−11 places: otherwise set the FP64 result to zero.

This conversion algorithm can be implemented in typically 15 SVE instructions per HPA lane.

It should be noted that, if desired, the above steps (iii) and (iv) could be combined as follows to cover cases where portions that are not the most significant could be negative:
  (iii) if the portion is negative, set bit[63] of FP64 result to 1 and negate the portion to obtain a positive 2's-complement number; set bits [62:52] of the FP64 result to the calculated exponent; if the biased exponent>0, logically shift left the HPA portion by CLZ−11 places: otherwise set the FP64 result to zero.

When desired, a single FP64 result can be produced that represents the final accumulated value as accurately as possible. This can be achieved for example by applying an algorithm suggested by Y. Hida, X. S. Li and D. H. Bailey, "Algorithms for Quad-Double Precision Floating Point Arithmetic," *Proc. 15th IEEE Symposium on Computer Arithmetic*, Vail Col., June 2001, pp. 155-162.

Working from the bottom pair of lanes up, the Fast2Sum operation is applied successively to the next higher lane and the upper sum obtained from Fast2Sum. Then, the process is repeated working form the topmost pair of values just obtained downwards and applied successively to the next lower value and the lower sum obtained from Fast2Sum. The top-most element of the resulting vector of FP64 numbers may then be guaranteed to be within 0.5 ulp of the HPA number.

An HPA accumulator comprising l portions has a wordlength of lp bits and occupies l SVE vector registers. FCVTH{A} instructions executed on a k×128 bit SVE vector unit can convert and accumulate 2k FP64 or 4k FP32 numbers into one portion of 2k HPA accumulators. FCVTH{A} instructions are fully pipelined so that a block of n FP64 addends can be accumulated into 2k p−1-bit HPA accumulators in n·(l/2k)+1 cycles. Typical values of l and k are 2-4 (although k could be as high as 16) so that, if l=k, n FP64 numbers (or 2n FP32 numbers) could be accumulated in k parallel accumulators in n/2 cycles. By contrast, on ARM's Cortex-A72, the same reproducible accumulation would require 3n cycles because the sums have to happen in order, and a dependent fused multiply-add (FMA) requires 3 cycles between adds. Thus HPA offers typically 12 times acceleration for FP32 accumulation over conventional FP processing.

As noted above, HPA redundancy would need to be eliminated or resolved periodically. The method described above takes 3·(l−1) instructions and would need to be performed once every $2^{64-p}$ accumulations: for a typical value of p=50, this represents a tiny processing overhead of <0.1%. Similarly, reducing a vector of HPA accumulators to scalar form, resolving redundancy in the scalar HPA, and converting the scalar HPA back to FP64 format would typically take 1+3·(l−1)+15·1≈19·1−3=35−73 instructions for a representative values of 1, compared with ≈n/4 cycles for the HPA accumulation of n numbers with n≈$10^3$ or higher.

Figure 9:
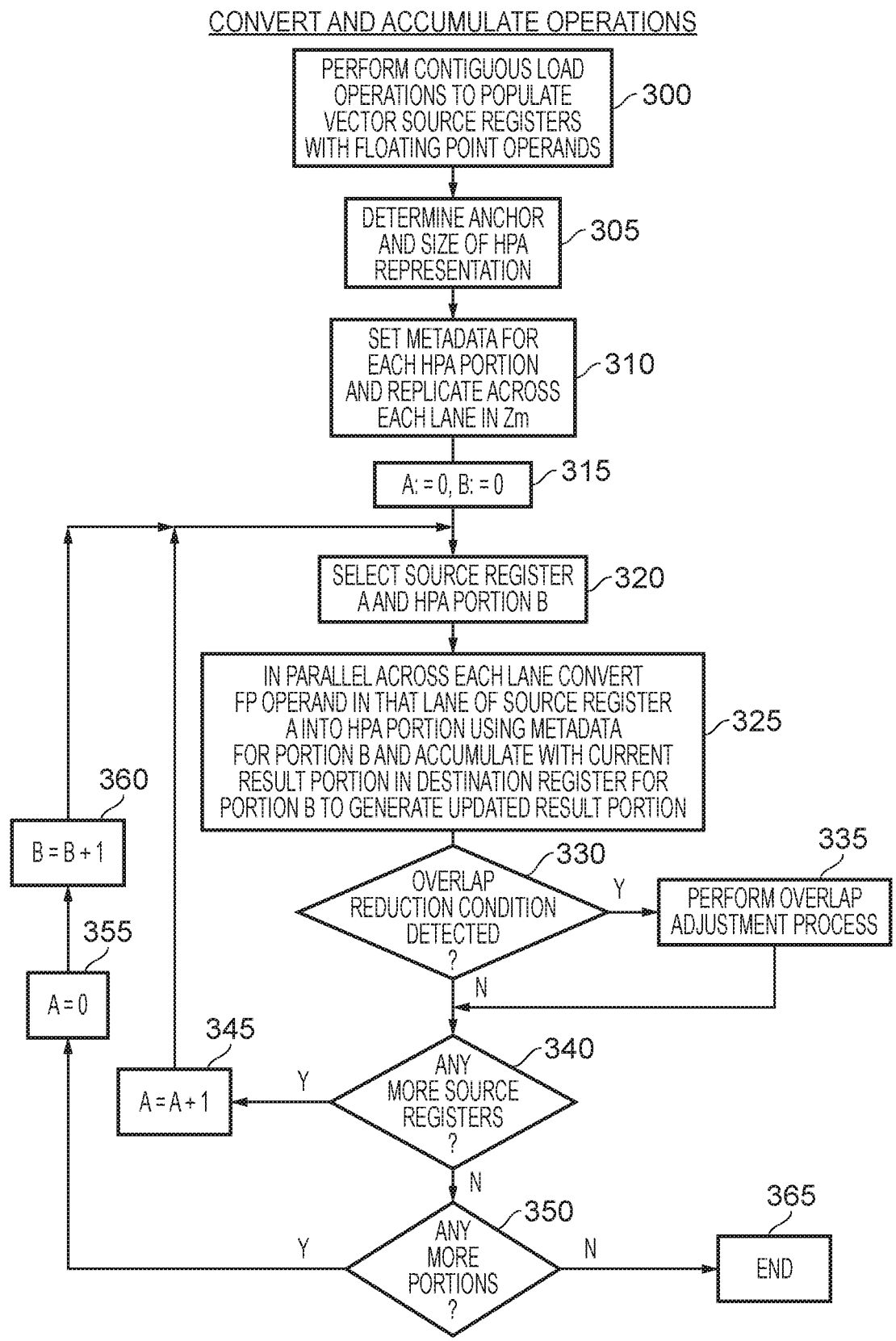
FIG. 9 is a flow diagram illustrating a process performed in accordance with one example to accumulate multiple HPA numbers.

As will be apparent from the above discussions, the main frequently used operation is a convert and accumulate operation. FIG. 9 is a flow diagram illustrating the performance of such operations in one example arrangement. At step 300, one or more contiguous load operations are performed to populate a number of vector source registers with floating-point operands. This is illustrated schematically in the top part of FIG. 10A where three vector registers are populated with floating-point source operands by performing contiguous vector load operations. In this example, it is assumed that each vector register provides four lanes.

At step 305, the anchor and size of the HPA representation is determined. As mentioned earlier, the anchor and the size of the HPA representation may be programmable, and the intention is to establish a suitable range to enable the most significant bits to be captured when accumulating multiple operands. Accordingly, in one example arrangement, a scanning operation can be performed to take into account all of the floating-point numbers in a group to be accumulated, to determine which floating-point operand is the largest. A desired number of portions for the HPA representation can then be determined (this number can be chosen without scanning all of the floating-point numbers to be accumulated), with the most significant portion being chosen to have a significance sufficient to enable the most significant bits of the largest floating-point operand to be captured (as determined from scanning all of the floating-point numbers to be accumulated). This hence dictates the choice of the anchor at step 305.

At step 310, the metadata is then set for each HPA portion, and replicated across each of the lanes in the source register Zm.

As discussed earlier, the metadata in each lane will actually comprise a number of metadata portions, each metadata portion corresponding to an associated one of the HPA portions within that lane. Any particular metadata portion can then be accessed using an appropriate index value into the source register Zm. This is illustrated schematically in the lower part of FIG. 10A. In particular, based on the source register identifier and an index value, a particular metadata portion within each lane can be accessed. As mentioned earlier by way of a specific example, in one arrangement the lanes may be 64 bits wide, and the metadata in each lane may comprise four 16-bit metadata portions, which can be for example identified by an index value i taking a value between 0 and 3.

At step 315, two parameters A and B are set equal to zero, and then at step 320 the source register A and HPA portion B are selected. Thereafter, at step 325, in parallel across each of the lanes, the relevant floating-point operand in that lane of the source register A is then converted into the current HPA portion under consideration using the metadata for portion B, and is then accumulated with the current result portion in the destination register for portion B to generate an updated result portion.

Thereafter, it is determined whether an overlap reduction condition is detected at step 320, and if so an overlap adjustment process is performed at step 335, for example using the techniques discussed earlier.

If no overlap reduction condition exists, or following performance of the overlap adjustment process if it does, the process proceeds to step 340, where it is determined whether there are any more source registers. In the example illustrated in FIG. 10A, it will be seen that there are three source registers, and accordingly at this point the process will follow the "yes" path where the parameter A is incremented at step 345, and the process returns to step 320.

FIGS. 10B to 10D schematically illustrate three iterations of the process of steps 320 to 345 for a first HPA portion (referred to as portion 0). In this example, the result portion for portion 0 is accumulated within the destination register Zd. Each result portion shown in FIGS. 10B to 10D is illustrated in the form A[q][r] where "q" indicates the portion and "r" indicates the HPA number. Hence A[0][1] indicates portion 0 of HPA result 1.

As will be seen from FIG. 10B, the first instruction is not an accumulate instruction, and accordingly, within each lane, the relevant floating-point value is subjected to a conversion operation to generate the first HPA portion, which is then stored in the destination register Zd.

As indicated in FIG. 10C, in the next iteration the source register moves to Zn+1, the same metadata portion is referenced, and an accumulation operation is performed in each lane to accumulate the converted portion with the previously stored result portion in the destination register (the destination register now being referred to as Zda to identify that it is an accumulate register).

FIG. 10D then illustrates the same process for the third iteration where the source register is Zn+2.

Thereafter, at step 340 it will be determined that there are no more source registers, and the process will proceed to step 350 where it is determined whether there are any more portions to process. In this instance, it will be determined that there is, and the process will proceed to step 355, where the parameter A is reset to zero and the parameter B is then incremented at step 360, prior to the process returning to step 320.

For the example illustrated with reference to FIGS. 10A to 10G, three further iterations through steps 320 to 345 will then be performed for the next portion of the HPA number, as illustrated schematically by FIGS. 10E and 10F. As shown, the result portions accumulated during this process are stored in the separate destination register Zd(a)+1.

Once at step 350 it is determined that there are no more portions to process, then the process ends at step 365. This is illustrated schematically in FIG. 10G for the example where each HPA value consists of just two portions. As can be seen from FIG. 10G, following the above described process there are four HPA accumulator values then stored across the two destination registers.

Whenever it is determined at step 330 that the overlap reduction condition is detected, then an overlap adjustment process can be performed at step 335, as illustrated schematically in FIG. 11.

As shown in FIG. 11, during a first process the upper (i.e. overlap) bits of Zda are added to the bottom bits of Zda+1, and then reset to zero, using the shift, add and and instructions illustrated. These instructions hence perform the shift, add and operations discussed earlier. Thereafter, the process can be repeated for any further portions. Hence, if each of the HPA numbers has three portions as shown in FIG. 11, a subsequent series of shift, add and operations can then be performed to add the upper bits of Zda+1 to the bottom bits of Zda+2.

Once the desired conversion and accumulation operations have been performed, then a series of HPA result values will have been produced, each occupying a different lane within a series of registers, as shown schematically in FIG. 12. In one example arrangement, these various results can be accumulated into a single scalar HPA result as illustrated in FIG. 12, through a series of add operations. In this example, it is assumed that any overlaps are first resolved, so that there is no need to specify the value of the overlap bits. It is also assumed that all HPA portions in the same register have the same anchor information. As shown, a series of existing SVE reduction instructions can be executed to produce associated final result portions 370, 372, 374, these three portions representing one final HPA number.

FIG. 13 schematically illustrates conversion of such a final HPA result into one or more floating-point values In the example shown, a floating-point value can be generated for each of the HPA portions if desired, so as to retain the precision available within the HPA number. By converting the values back into FP format, there is no need to maintain the metadata information, and accordingly the floating-point values can be stored away for future reference, for example by writing them back to memory. If desired, the created floating-point values can be re-ordered so as to be stored within a single register, as shown by the lower portion of FIG. 13. As shown in FIG. 13, a series of instructions can be executed, operating on one HPA portion at a time to convert that portion into a floating-point value, using for example the process discussed earlier.

Figure 14:
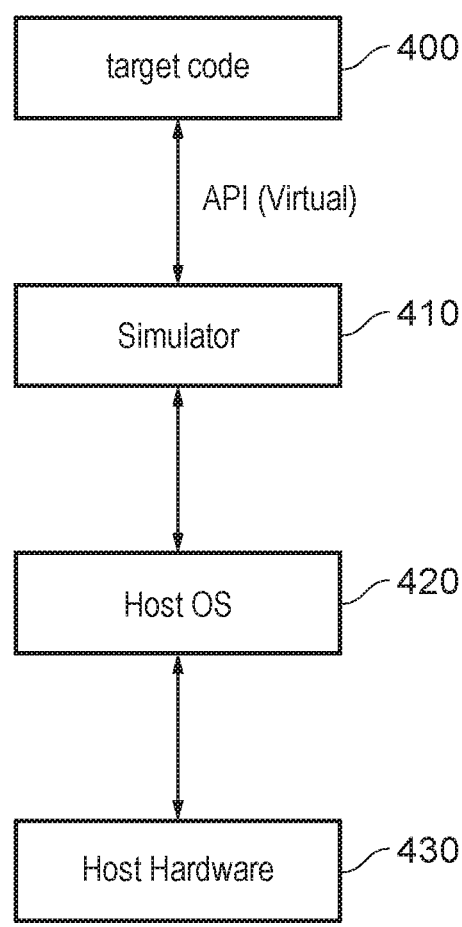
FIG. 14 illustrates a simulator implementation that may be used.

FIG. 14 illustrates a simulator implementation that may be used. Whilst the earlier described examples implement the present invention in terms of apparatus and methods for operating specific processing hardware supporting the techniques concerned, it is also possible to provide an instruction execution environment in accordance with the examples described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 430, optionally running a host operating system 420, supporting the simulator program 410. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that examples have previously been described with reference to particular hardware constructs or features, in a simulated example, equivalent functionality may be provided by suitable software constructs or features. For example, particular circuitry may be implemented in a simulated example as computer program logic. Similarly, memory hardware, such as a register or cache, may be implemented in a simulated example as a software data structure. In arrangements where one or more of the hardware elements referenced in the previously described examples are present on the host hardware (for example, host processor 430), some simulated examples may make use of the host hardware, where suitable.

The simulator program 410 may be stored on a computer-readable storage medium (which may be a non-transitory medium), and provides a program interface (instruction execution environment) to the target code 400 (which may include applications, operating systems and a hypervisor) which is the same as the application program interface of the hardware architecture being modelled by the simulator program 410. Thus, the program instructions of the target code 400, including instructions to perform the above-described conversion and accumulation of HPA values within respective lanes, may be executed from within the instruction execution environment using the simulator program 410, so that a host computer 430 which does not actually have the hardware features of the apparatus discussed above can emulate these features.

Most FP accumulations use only a small fraction of the range of FP numbers, and so they can be computed more quickly and correctly using HPA numbers. HPA accumulation is reproducible and parallelizable, and with appropriate data bounds, is highly accurate or even exact. Use of HPA is not appreciably harder than FP for programmers and in cases where FP's lack of associativity causes problems, HPA is much easier on programmers. Very few people are trained to analyze situations where FP computation gives poor results. One frequent response is to recode using a wider FP format, but wider formats have poor performance for anything bigger than FP64 and consume unnecessary power and silicon area. Using HPA gives better performance and removes the most pernicious of the roundoff problems.

In a first example arrangement, an apparatus may comprise processing circuitry, for example one or more CPUs, GPUs or other suitable processing circuitry. The processing circuitry may be arranged to perform one or more arithmetic operations on at least one long integer operand. In an example the at least one long integer operand may be a two's complement integer i. The long integer operand may comprise 128 bits or more.

The apparatus may additional comprise a plurality of vector data storage registers, for example a vector storage register may be an area of static or dynamic memory accessible to the processing circuitry which is arranged to store one or more one dimensional array of data (vectors). In an example each of one or more vectors may be used for vector processing e.g. SIMD processing. In an example each of the plurality of registers may be divided into multiple regions 0, . . . , N. The same region of each register may be operated on in parallel, for example vector arithmetic instructions may only allow an element stored in region N of a first vector register to take part in operations with elements stored in region N from the plurality of other vector registers. In the examples described herein the regions of each of the register that can be operated on in parallel are described as lanes, e.g. Region 0 of each register forms a single lane, region 1 forms a further lane etc. In an example, the at least one long integer operand is stored in a single lane across the plurality of vector data storage registers, this lane is described herein as the common lane. The common lane may comprise a plurality of lanes. In a further example each of the one or more long integer operands is stored in one or more of the plurality of lanes, e.g. lanes 0, . . . , N, across the plurality of vector storage data registers. In an example each of the one or more arithmetic operations are performed on each of the plurality of long integer operands simultaneously. The size of common lane across the plurality of vector storage registers is variable.

In an example the one or more arithmetic operations may generate a result value based on the one or more of long integer operands wherein for the at least one arithmetic operation the processing circuitry is responsive to programmable significance data indicative of a target significance for the result value. As described above, in an example a high-precision anchored number is comprised of a pair of numbers (i,a), the long integer operand and the programmable significance data, e.g. the long integer operand may be a high-precision fixed point operand. The programmable significance data may be a smaller anchor integer that represents the value of the weight of the bits of the long two's complement integer i. In an example each of the one or more of the long integer operands have the same programmable significance data.

In one example the processing circuitry may be arranged to perform the one or more arithmetic operations on the at least one long integer operand from the lower order bits to the higher order bits. In an alternative example the processing circuitry is arranged to perform the one or more arithmetic operations on the at least one long integer operand from the higher order bits to the lower order bits.

The plurality of data storage registers may be arranged in an order specified in a control field. In an example the control field may be contained within an instruction, for example, an architectural instruction. In another example the control field may be contained within a register.

In an example a method may be executed on the aforementioned processing circuitry, the method comprising performing the one or more arithmetic operations on at the least one long integer operand; wherein the at least one long integer operand is stored in a common lane across the plurality of vector data storage registers. The method may further comprise performing one or more arithmetic operations on a plurality of long integer operands, wherein each of the plurality of long integer operands is stored in a plurality of common lanes across the plurality of vector storage data registers. The method may also further comprise generating a result value based on the plurality of long integer operands wherein for the at least one arithmetic operation the processing circuitry is responsive to programmable significance data indicative of a target significance for the result value, wherein each of the plurality of long integer operands have the same programmable significance data.

In an example the method may be executed on long integer operands that are high precision fixed point operands.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
    a set of vector data storage elements, each vector data storage element providing a plurality of sections for storing data values, a plurality of lanes being provided within the set where each lane comprises a corresponding section from each vector data storage element;
    processing circuitry to perform an arithmetic operation on an input operand value comprising a plurality of portions, by performing an independent arithmetic operation on each of the plurality of portions, in order to produce a result value comprising a plurality of result portions; and
    storage circuitry to store the result value within a selected lane of said plurality of lanes, such that each result portion is stored in a different vector data storage element within the corresponding section for the selected lane.

2. An apparatus as claimed in claim 1, wherein the processing circuitry is arranged to process each portion of the input operand value as an integer value when performing the independent arithmetic operation.

3. An apparatus as claimed in claim 1, wherein the processing circuitry is arranged to perform the independent arithmetic operation sequentially multiple times, so as to produce within the selected lane one of the result portions of the result value each time the processing circuitry performs the independent arithmetic operation.

4. An apparatus as claimed in claim 1, wherein:
    the processing circuitry is arranged to perform, as the arithmetic operation, an accumulation operation to accumulate the input operand value with another operand value that comprises the plurality of portions, in order to produce the result value comprising the plurality of result portions.

5. An apparatus as claimed in claim 4, wherein:
    the another operand value is an existing result value, and the processing circuitry is arranged to perform the accumulation operation in order to generate an updated result value to form the result value to be stored in the selected lane.

6. An apparatus as claimed in claim 5, wherein the storage circuitry is arranged to store the existing result value across multiple vector data storage elements within the selected lane, and to overwrite each portion of the existing result value with the corresponding result portion of the result value generated by the processing circuitry when performing the accumulation operation.

7. An apparatus as claimed in claim 1, wherein the processing circuitry is arranged to identify a significance of bits of each portion of the input operand value based on an anchor value.

8. An apparatus as claimed in claim 7, further comprising metadata storage to hold metadata for the selected lane, the metadata comprising a metadata portion for each portion of the input operand value, and providing information enabling the processing circuitry to identify the significance of bits of each portion of the input operand value.

9. An apparatus as claimed in claim 8, wherein the processing circuitry comprises conversion circuitry to generate each portion of the input operand value from a provided value and the corresponding metadata portion.

10. An apparatus as claimed in claim 9, wherein the provided value is a floating-point value, and in association with each independent arithmetic operation the conversion circuitry is used to generate a corresponding portion of the input operand value from the floating-point value and the corresponding metadata portion.

11. An apparatus as claimed in claim 10, wherein:
the processing circuitry is arranged to perform, as the independent arithmetic operation, an independent accumulation operation to accumulate a corresponding portion from the input operand value with the corresponding portion of another operand value that comprises the plurality of portions, in order to produce a corresponding result portion of the result value; and
the conversion circuitry is used during the independent accumulation operation to generate the corresponding portion of the input operand value from the floating-point value and the metadata portion associated with the corresponding portion.

12. An apparatus as claimed in claim 11, wherein corresponding portions of the input operand value and the another operand value have the same bit significance.

13. An apparatus as claimed in claim 1, wherein:
the input operand value comprises an M-bit value having a redundant representation representing a P-bit numeric value using the plurality of portions, where each portion comprises N bits, and where M>P>N,
wherein the processing circuitry is configured to identify a significance of bits of each N-bit portion of the redundant representation based on an anchor value, and within a group of at least two adjacent N-bit portions, a plurality of overlap bits of a lower N-bit portion of the group have a same significance as a plurality of least significant bits of at least one upper N-bit portion of the group.

14. An apparatus as claimed in claim 13, wherein the processing circuitry comprises conversion circuitry to perform a conversion operation to convert a provided value to a converted M-bit data value having the redundant representation.

15. An apparatus as claimed in claim 13, further comprising metadata storage to hold metadata for the selected lane, the metadata comprising a metadata portion for each N-bit portion of the input operand value, and providing information enabling the processing circuitry to identify the significance of bits of each N-bit portion and a number of overlap bits in each N-bit portion.

16. An apparatus as claimed in claim 13, wherein the processing circuitry is configured to perform an overlap reduction operation on a first M-bit value having the redundant representation to generate a second M-bit value having the redundant representation in which the overlap bits in at least one N-bit portion of the second M-bit value represent a smaller magnitude than the overlap bits of at least one corresponding N-bit portion of the first M-bit value.

17. An apparatus as claimed in claim 1, wherein:
the processing circuitry is replicated for each of a plurality of selected lanes, with an input operand value being provided for each of said plurality of selected lanes, where each of the plurality of input operand values comprises the plurality of portions, and each independent arithmetic operation is arranged to be performed in parallel across the plurality of selected lanes, in order to produce a plurality of result values each comprising a plurality of result portions; and
the storage circuitry is arranged to store each of the plurality of result values within a corresponding selected lane of the plurality of selected lanes, such that a corresponding result portion of each result value is stored in a corresponding section of the same vector data storage element.

18. An apparatus as claimed in claim 17, further comprising metadata storage to hold metadata for each selected lane, the metadata comprising a metadata portion for each portion of the corresponding input operand value, and providing information enabling the processing circuitry to identify the significance of bits of each portion of the corresponding input operand value.

19. An apparatus as claimed in claim 18, wherein corresponding portions of the plurality of input operand values have the same bit significance, and the metadata is replicated for each selected lane.

20. An apparatus as claimed in claim 17, wherein the processing circuitry is further arranged to perform a reduction operation to combine the multiple result values into a single result value.

21. A method of processing an input operand value having a plurality of portions, comprising:
providing a set of vector data storage elements, each vector data storage element providing a plurality of sections for storing data values, a plurality of lanes being provided within the set where each lane comprises a corresponding section from each vector data storage element;
performing an arithmetic operation on the input operand value by performing an independent arithmetic operation on each of the plurality of portions, in order to produce a result value comprising a plurality of result portions; and
storing the result value within a selected lane of said plurality of lanes, such that each result portion is stored in a different vector data storage element within the corresponding section for the selected lane.

22. A non-transitory, computer-readable storage medium storing a computer program for controlling a host data processing apparatus to provide an instruction execution environment comprising:
a set of vector data structures, each vector data structure providing a plurality of sections for storing data values, a plurality of lanes being provided within the set where each lane comprises a corresponding section from each vector data structure;
processing program logic to perform an arithmetic operation on an input operand value comprising a plurality of portions, by performing an independent arithmetic operation on each of the plurality of portions, in order to produce a result value comprising a plurality of result portions; and
storage program logic to store the result value within a selected lane of said plurality of lanes, such that each result portion is stored in a different vector data structure within the corresponding section for the selected lane.

* * * * *